(12) United States Patent
Takayanagi

(10) Patent No.: US 9,723,209 B2
(45) Date of Patent: Aug. 1, 2017

(54) IMAGE SHAKE CORRECTION DEVICE, IMAGE PICKUP APPARATUS, AND CONTROL METHOD

(71) Applicant: CANON KABUSHIKI KAISHA, Tokyo (JP)

(72) Inventor: Wataru Takayanagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/955,954

(22) Filed: Dec. 1, 2015

(65) Prior Publication Data

US 2016/0165139 A1    Jun. 9, 2016

(30) Foreign Application Priority Data

Dec. 3, 2014    (JP) .................................. 2014-244785

(51) Int. Cl.
*H04N 5/232*    (2006.01)

(52) U.S. Cl.
CPC ..... *H04N 5/23261* (2013.01); *H04N 5/23258* (2013.01); *H04N 5/23287* (2013.01)

(58) Field of Classification Search
CPC ................................... H04N 5/23251–5/23287
See application file for complete search history.

(56) References Cited

U.S. PATENT DOCUMENTS

| 5,835,641 A * | 11/1998 | Sotoda | ............... H04N 5/23248 348/169 |
| 2008/0094498 A1* | 4/2008 | Mori | ......................... G03B 5/02 348/352 |
| 2016/0028958 A1* | 1/2016 | Tsuchiya | ................... G03B 5/00 348/208.4 |

FOREIGN PATENT DOCUMENTS

JP        04-163535 A    6/1992

* cited by examiner

*Primary Examiner* — Albert Cutler
(74) *Attorney, Agent, or Firm* — Cowan, Liebowitz & Latman, P.C.

(57) ABSTRACT

Provided is an image shake correction device to correct image shake during panning photographing to let the movement of an image pick-up apparatus follow the movement of a main subject which uses a shift lens group. The image shake correction device executes a determination process on a motion vector for calculating an angular velocity of the main object for use in calculation of a drive signal of the shift lens group. The image shake correction device changes the determination process on the motion vector according to a state of the image pick-up apparatus.

13 Claims, 26 Drawing Sheets

| Motion vector determination threshold value | Main object | Background | Other moving object | Erroneous detection |
|---|---|---|---|---|
| $\alpha 1$ | Strict | Strict | – | Loose |
| $\alpha 2$ | Normal | Normal | – | Normal |
| $\alpha 3$ | Loose | Normal | – | Strict |
| $\alpha 4$ | Loose | Normal | Loose | Strict |
| $\alpha 5$ | Loose | Normal | Loose | Strict |
| $\alpha 6$ | Loose | Normal | Loose | Strict |
| $\alpha 7$ | Loose | Normal | – | Strict |

IMAGE SHAKE CORRECTION DEVICE, IMAGE PICKUP APPARATUS, AND CONTROL METHOD

BACKGROUND OF THE INVENTION

Field of the Invention

The present invention relates to an image shake correction device, an image pickup apparatus, and a control method.

Description of the Related Art

Panning photography has been proposed as a photographic technique for expressing the sense of velocity of a moving object. In the panning photography, a photographer pans a camera in accordance with motion of an object, so that the moving object is stopped and a background flows. In the panning photography, the photographer needs to perform panning in accordance with the motion of the object. However, when a panning velocity is too fast or too slow, a difference between a movement velocity and the panning velocity occurs and an object image is shaken (image shake occurs).

Japanese Patent Laid-Open No. H4-163535 discloses an image shake correction device for driving an optical system during exposure to correct image shake based on a relative angular velocity of an object for an image pickup apparatus obtained before exposure and an angular velocity of the image pickup apparatus during the exposure.

In the image shake correction device disclosed in Japanese Patent Laid-Open No. H4-163535, a movement amount on an image plane of an object detected from a captured image and an angular velocity of the image pickup apparatus during exposure necessary to calculate the moving amount of an optical system for correcting image shake are assumed to be correct values. However, the detection precision of the moving amount on the image plane of the object changes according to the state of the camera. For example, in a state in which a camera is being accelerated for panning at the initiation of panning photographing, the detected moving amount on the image plane of the object is incorrect. If the movement amount on the image plane of the object is not correct, the shake of the object is not corrected and panning fails.

SUMMARY OF THE INVENTION

The present invention enables a determination process on a motion vector to be precisely executed to calculate a drive signal of an optical correction unit for correcting image shake during panning photographing.

According to an embodiment of the present invention, an image shake correction device to correct image shake during panning photographing to let the movement of an image pick-up apparatus follow the movement of a main subject which uses an optical correction unit includes a determination unit configured to execute a determination process on a motion vector for calculating an angular velocity of the main object for use in calculation of a drive signal of the optical correction unit; and a control unit configured to change the determination process by the determination unit according to a state of the image pick-up apparatus.

Further features of the present invention will become apparent from the following description of exemplary embodiments (with reference to the attached drawings).

DESCRIPTION OF THE EMBODIMENTS

Figure 1:
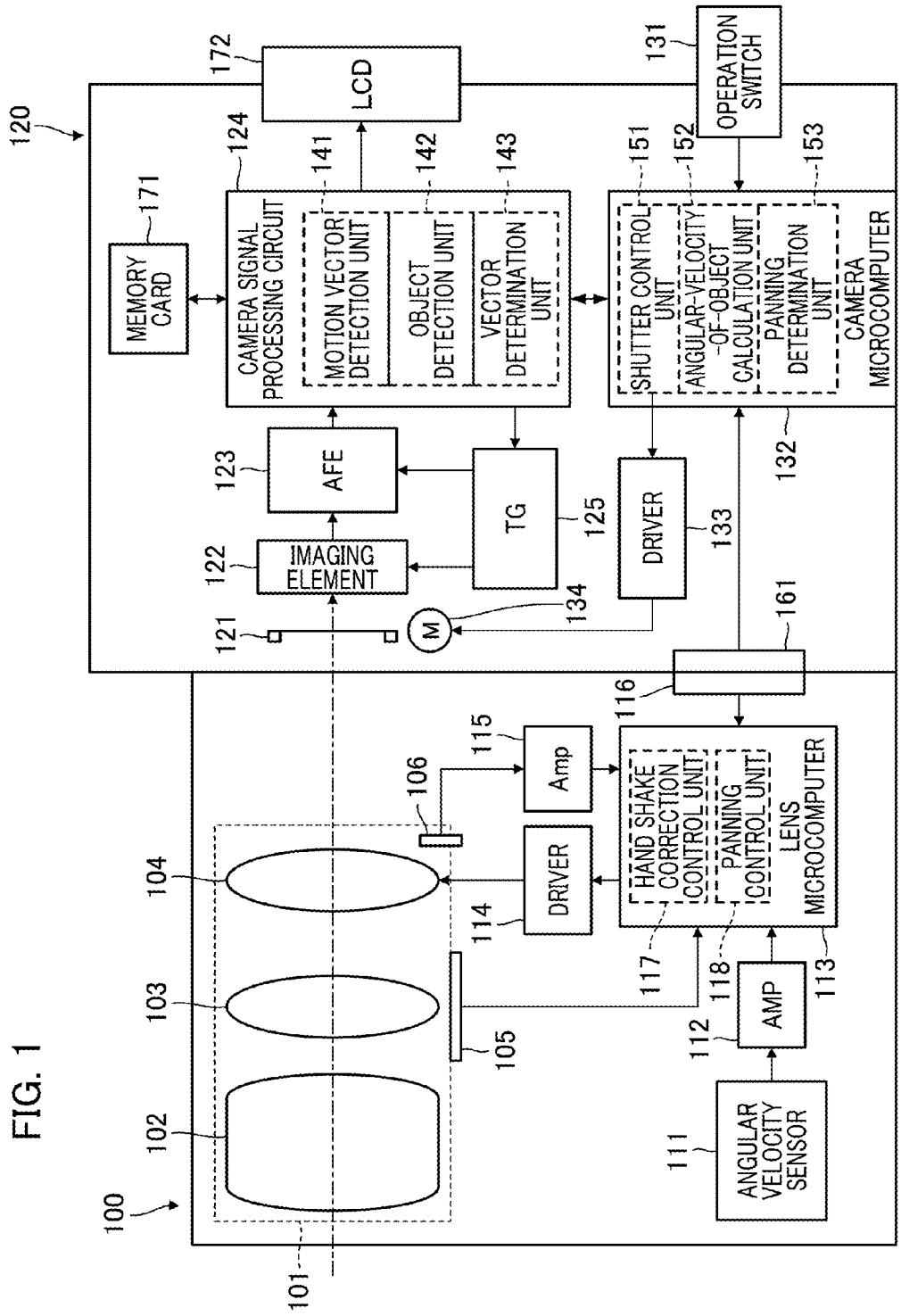
FIG. 1 is a diagram illustrating a configuration of an optical device having an image shake correction device according to an embodiment.

FIG. 1 is a diagram illustrating a configuration of an optical device having an image shake correction device of this embodiment.

The optical device illustrated in FIG. 1 is a camera system including an interchangeable lens 100 and a camera main body 120. Additionally, the optical device can be implemented as a single body of an interchangeable lens or implemented as an image pickup apparatus including a single body of a camera main body.

The interchangeable lens 100 includes a photographic lens unit 101. The photographic lens unit 101 includes a main imaging optical system 102, a zoom lens group 103, and a shift lens group 104. The zoom lens group 103 can change a focal length. The shift lens group 104 is an optical correction unit configured to optically correct the shake of an image in an optical axis due to a shaking of the image pickup apparatus by moving in a direction perpendicular to the optical axis. In addition, the interchangeable lens 100 includes a zoom encoder 105 configured to detect a position of a zoom lens group, a position sensor 106 configured to detect a position of the shift lens group, an angular velocity sensor 111 configured to detect the shaking of the image pickup apparatus, and an amplifier 112 configured to amplify an output of the angular velocity sensor 111.

In addition, the interchangeable lens 100 includes a lens system control microcomputer 113 (hereinafter referred to as lens microcomputer) and a driver 114 configured to drive the shift lens according to a drive signal. In addition, the interchangeable lens 100 includes an amplifier 115 configured to amplify an output of the position sensor 106 of the shift lens, the camera main body 120, and a mount contact unit 116.

The lens microcomputer 113 includes a camera shake correction control unit 117 configured to perform camera shake correction control and a panning control unit 118 configured to perform control for panning assistance. The lens microcomputer 113 performs focus lens control, diaphragm control, etc., but a description thereof will be omitted. For camera shake correction, for example, detection and correction are performed with respect to two axes orthogonal in a horizontal direction and a vertical direction but only one axis is disclosed in FIG. 1.

The camera main body 120 includes a shutter 121, an imaging element 122 such as a complementary metal-oxide-semiconductor (CMOS) sensor, an analog signal processing circuit (analog front end (AFE)) 123, a camera signal processing circuit 124, and a timing generator 125 configured to set operation timings of the imaging element 122 and/or the analog signal processing circuit 123. In addition, the camera main body 120 includes a power switch, a release switch, and an operation switch 131. The operation switch 131 has a changeover switch configured to switch whether to set a panning assist mode, etc.

In addition, the camera main body 120 includes a camera system control microcomputer (hereinafter referred to as camera microcomputer) 132 configured to control a system of the entire camera, a driver 133 configured to drive a motor for performing a shutter operation, and a shutter driving motor 134. In addition, the camera main body 120 monitors a memory card 171 configured to record a captured image, a liquid crystal panel (hereinafter, LCD) 172 configured to monitor an image to be captured by the camera and display the captured image, and a mount contact unit 161 associated with the interchangeable lens 100. The lens microcomputer 113 and the camera microcomputer 132 perform serial communication at a predetermined timing via the mount contact units 116 and 161.

The camera signal processing circuit 124 includes a motion vector detection unit 141, an object detection unit 142, and a motion vector determination unit 143. The motion vector detection unit 141 detects a motion vector from the captured image. The object detection unit 142 executes human-body detection, face detection, face recognition, recognition of a specific physical object, etc. The motion vector determination unit 143 determines which of a motion vector of a main object, a motion vector of a background, a motion vector of another moving object, and an erroneous detection motion vector corresponds to the motion vector detected by the motion vector detection unit 141 using a threshold value to be dynamically changed. A determination result is output to the camera microcomputer 132. In addition, the camera microcomputer 132 includes a shutter control unit 151, an angular-velocity-of-object calculation unit 152, and a panning determination unit 153. The angular-velocity-of-object calculation unit 152 calculates an angular velocity of a main object based on a determination result of a motion vector by the motion vector determination unit 143.

When a power supply of the camera is turned ON through the operation switch 131, its state change is detected by the camera microcomputer 132 and the supply of power to each circuit of the camera main body 120 and initial setting is performed according to control of the camera microcomputer 132. In addition, power is supplied to the interchangeable lens 100 and the initial setting within the interchangeable lens 100 is performed through control of the lens microcomputer 113. Communication is initiated at a predetermined timing between the lens microcomputer 113 and the camera microcomputer 132. In this communication, the state of the camera, photographic settings, etc. are transmitted from the camera main body 120 to the interchangeable lens 100. In addition, focal length information of the lens, angular velocity information, etc. are transmitted from the interchangeable lens 100 to the camera main body 120.

During a normal mode in which no panning assist mode is set, the angular velocity sensor 111 detects the shake of the camera due to a hand shake or the like within the interchangeable lens and the camera shake correction control unit 117 performs a camera shake correction operation by driving the shift lens group using a detection result. In the configuration illustrated in FIG. 1, it is possible to implement an image shake correction device through at least the lens microcomputer 113, the camera microcomputer 132, and the camera signal processing circuit 124.

Figure 2:
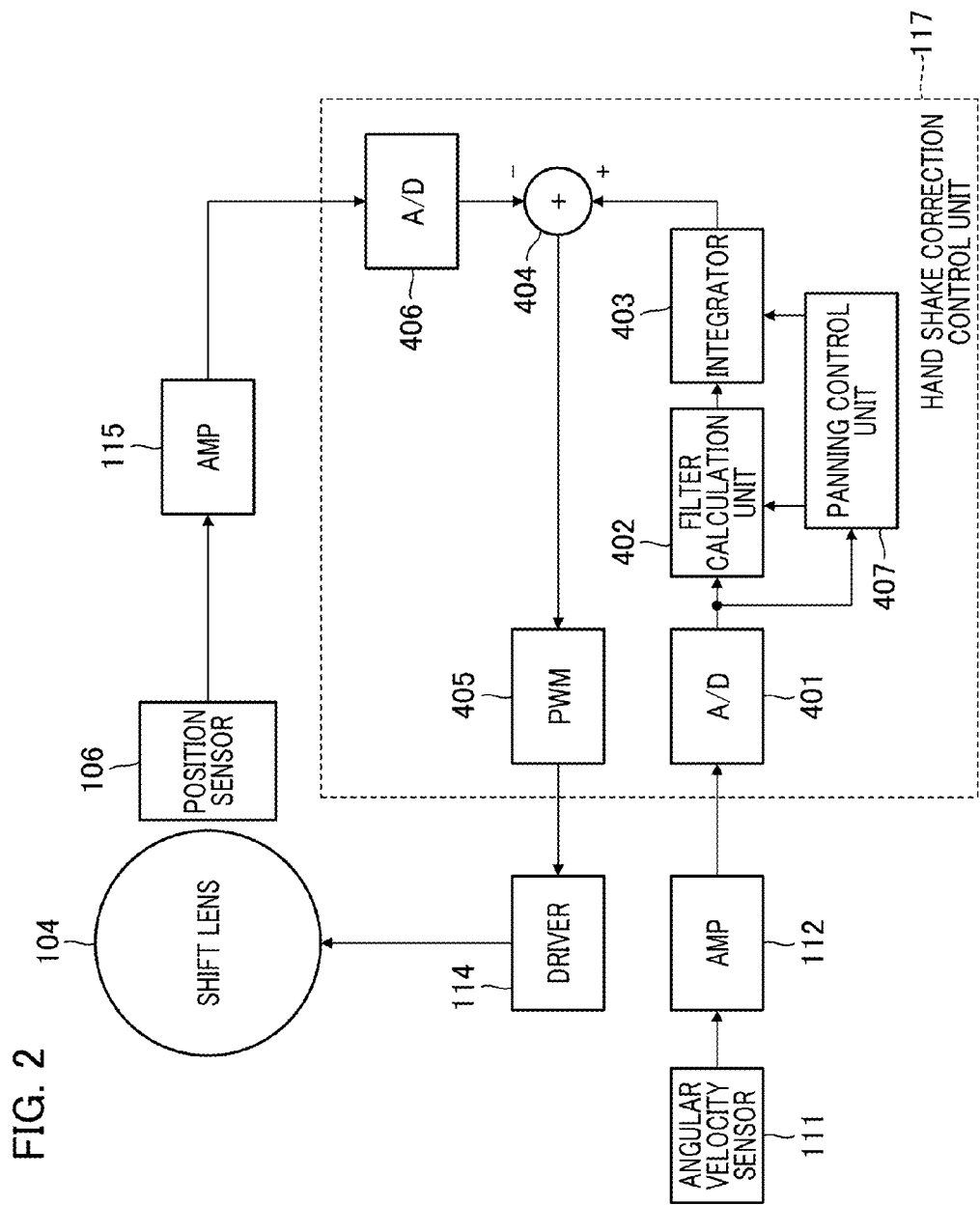
FIG. 2 is a diagram illustrating a driving of a shift lens by a camera shake correction control unit.

FIG. 2 is a diagram illustrating driving of the shift lens by a camera shake correction control unit.

Elements common to FIG. 1 are denoted by the same reference numbers and description thereof will be omitted. In FIG. 2, reference numbers 401 to 407 denote detailed elements of the camera shake correction control unit 117. Reference number 401 denotes an analog-to-digital (A/D) converter, and converts a shake signal detected by the angular velocity sensor 111 into a digital signal. Data sampling of an output of the angular velocity sensor 111 is performed at about 1 to 10 kHz. Reference number 402 denotes a filter calculation unit constituted of a high pass filter (HPF) or the like which performs a panning step by removing an offset component included in the output of the angular velocity sensor and changing a cutoff frequency.

Reference number 403 denotes an integrator which converts angular velocity data into angular displacement data to generate a driving target data of the shift lens. Reference number 406 denotes an A/D converter which converts an output of the position sensor 106 into digital data. Reference number 404 denotes an adder which calculates an actual drive signal of the shift lens by subtracting a current shift lens position from a driving target value of the shift lens. Reference number 405 denotes a pulse width modulation (PWM) output unit which outputs the calculated driving amount signal to the shift lens driving driver 114. Reference number 407 denotes a panning control unit which determines whether the camera has been panned from a state of the angular velocity data. If it is determined that the camera has been panned, the panning control unit 407 performs a cutoff frequency change control of the filter calculation unit 402 and adjusts the output of the integrator 403

Figure 3:
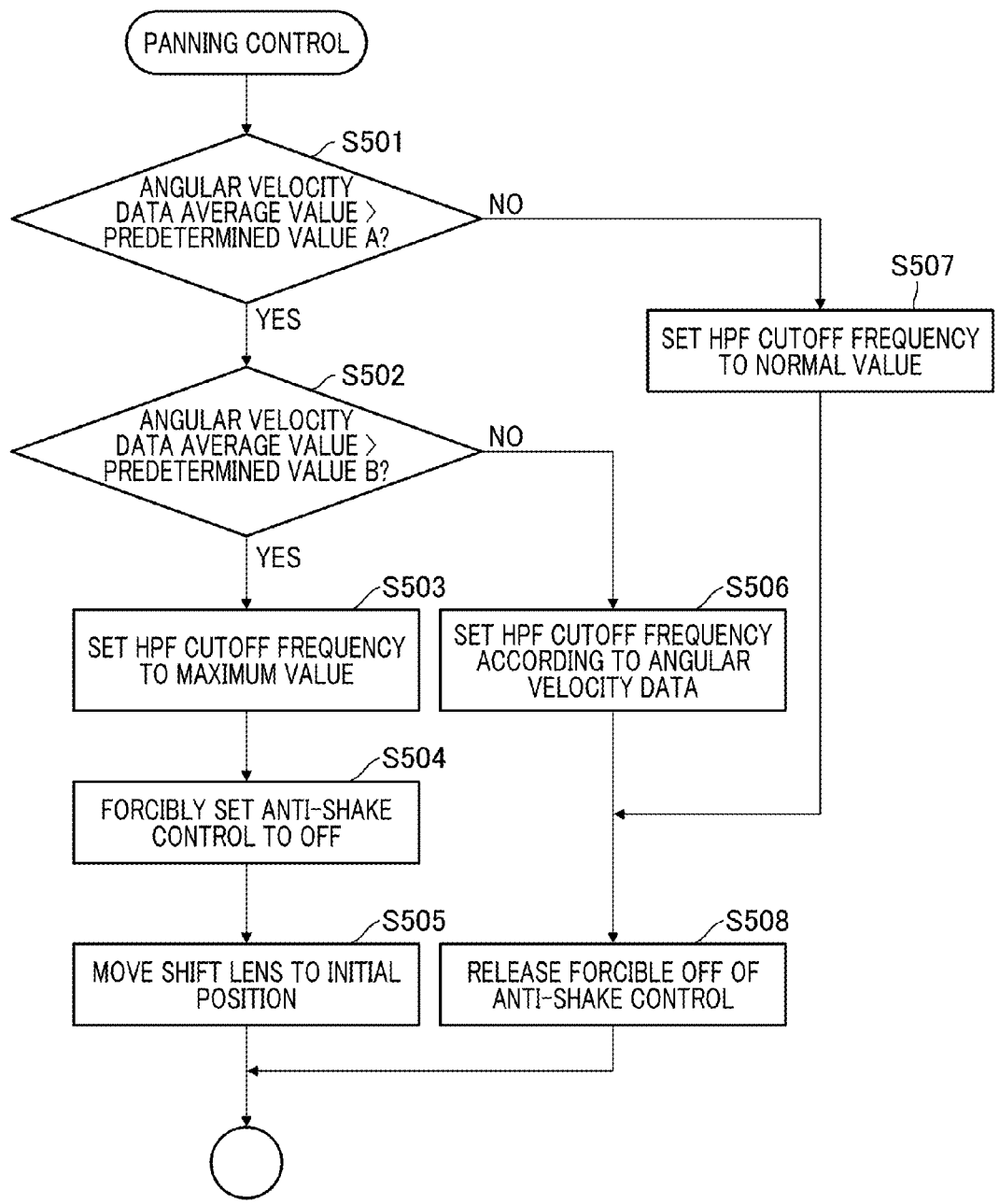
FIG. 3 is a diagram illustrating a process of the camera shake correction control unit according to presence or absence of panning.

FIG. 3 is a flowchart illustrating a process of the camera shake correction control unit according to a presence or absence of panning.

In S501, the camera shake correction control unit 117 determines whether an average value of angular velocity data (an average value of a predetermined number of times of sampling) taken by the A/D converter 401 is greater than a predetermined value A. If the average value of the angular velocity data is less than or equal to the predetermined value A, the camera shake correction control unit 117 determines that the panning has not been performed. In S507, the camera shake correction control unit 117 sets a cutoff frequency of the HPF to a normal value. The process proceeds to S508.

If the average value of the angular velocity data is greater than the predetermined value A, the process proceeds to step S502. In S502, the camera shake correction control unit 117 determines whether the average value of the angular velocity data is greater than a predetermined value B.

If the average value of the angular velocity data is greater than the predetermined value B, the camera shake correction control unit 117 determines that fast panning has been performed and the process proceeds to S503. In S503, the camera shake correction control unit 117 sets the cutoff frequency of the HPF within the filter calculation unit 402 to a maximum value. In S504, the camera shake correction control unit 117 forcibly turns the camera shake correction control OFF. This setting is for gradually stopping the shift lens by increasing the cutoff frequency of the HPF to eliminate the discomfort when the camera shake correction control is turned OFF. In addition, there is no discomfort even when camera shake remains by turning camera shake correction OFF because an amount of movement due to panning relative to a magnitude of the camera shake is significantly large during fast panning. When attempting to correct panning as a large shake without performing this setting, motion is viewed as significantly unnatural motion because a picture is stopped at the initiation of panning, but the picture suddenly greatly moves at the moment at which the shift lens has reached a correction end thereafter.

Next, in S505, the camera shake correction control unit 117 moves the shift lens group 104 to an initial position by gradually changing an output of the integrator 403 from current data to data of the initial position. This is because it is desirable that the position of the shift lens group be the initial position of a driving range when the camera shake correction operation is resumed.

The camera shake correction control unit 117 determines that slow panning is performed when the average value of the angular velocity data is less than or equal to the predetermined value B in S502, and the process proceeds to S506. In S506, the camera shake correction control unit 117 sets the cutoff frequency of the HPF according to a magnitude of the angular velocity data. This is because it is difficult to ignore an influence of camera shake when the slow panning is performed and a process is necessary to perform camera shake correction while maintaining tracking of a picture during panning to an extent to which there is no unnaturalness. Subsequently, in S508, the camera shake correction control unit 117 releases OFF state of the camera shake correction control.

Figure 4:
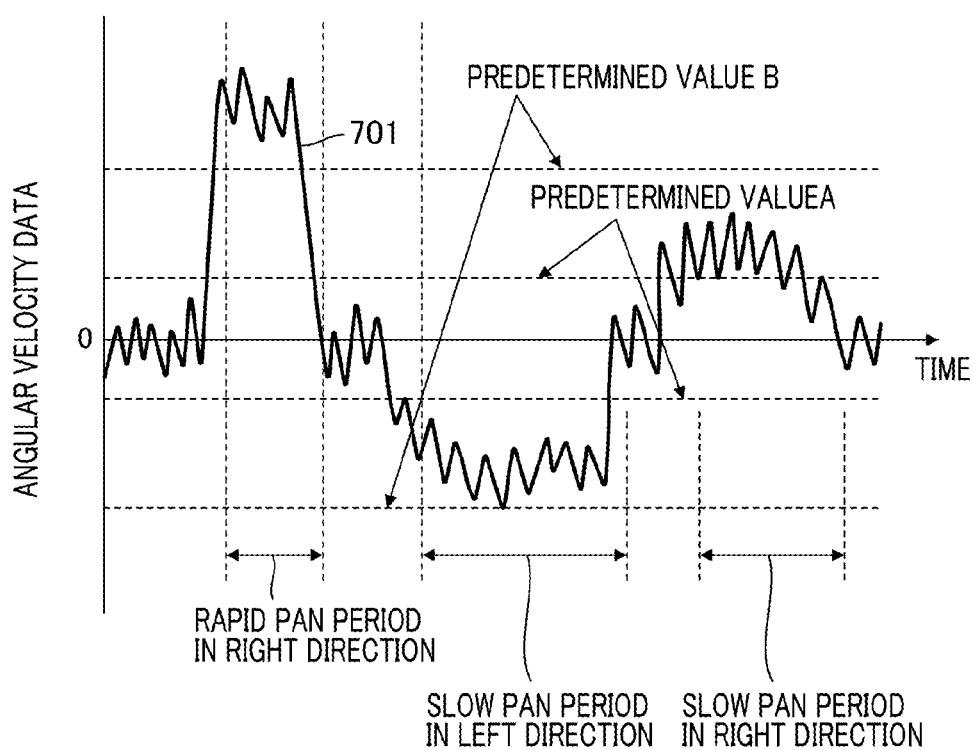
FIG. 4 is a graph illustrating a relation of angular velocity data and predetermined values A and B.

FIG. 4 is a diagram illustrating a relation of the angular velocity data in a horizontal direction during panning and the predetermined values A and B.

Reference number 701 denotes a sample of angular velocity data. In this example, an output of a positive (+) direction is provided when panning is performed in the right direction and an output of a negative (−) direction is provided when the panning is performed in the left direction. In the example illustrated in FIG. 4, rapid panning in the right direction and slow panning in the left and right directions are detected. As seen from FIG. 4, the angular velocity data is greatly deviated from the initial value (here, 0) during panning. When an automatic target value of the shift lens is calculated by integrating the data, the output of the integrator has a very large value according to a direct current (DC) offset component and a state in which control is disabled is given. Therefore, it is necessary to cut the DC component by changing the cutoff frequency of the HPF to a high value when the panning is detected. In the case of the rapid panning, the output of the integrator is prevented from increasing by further increasing the cutoff frequency. In particular, when the panning is fast, no discomfort occurs even when the camera shake correction function is turned OFF in the panning direction because the motion of the picture by the panning velocity is significantly large with respect to the shake of the hand. It is possible to monitor an image without discomfort even during panning by performing panning control as described above.

Returning to the description of FIG. 1, the camera microcomputer 132 is switched to panning assist control when the panning assist mode is set according to the operation switch 131. In addition, information indicating that the switching to the panning assist control has been performed is transmitted from the camera microcomputer 132 to the lens microcomputer 113 and the lens microcomputer 113 proceeds to the panning assist mode.

While the panning assist mode is set, the camera main body 120 outputs a motion vector of an object detected by the motion vector detection unit 141 from captured video information during panning photographing. In addition, angular velocity data detected by the angular velocity sensor within the interchangeable lens 100 is received from the lens microcomputer 113.

Figure 5:
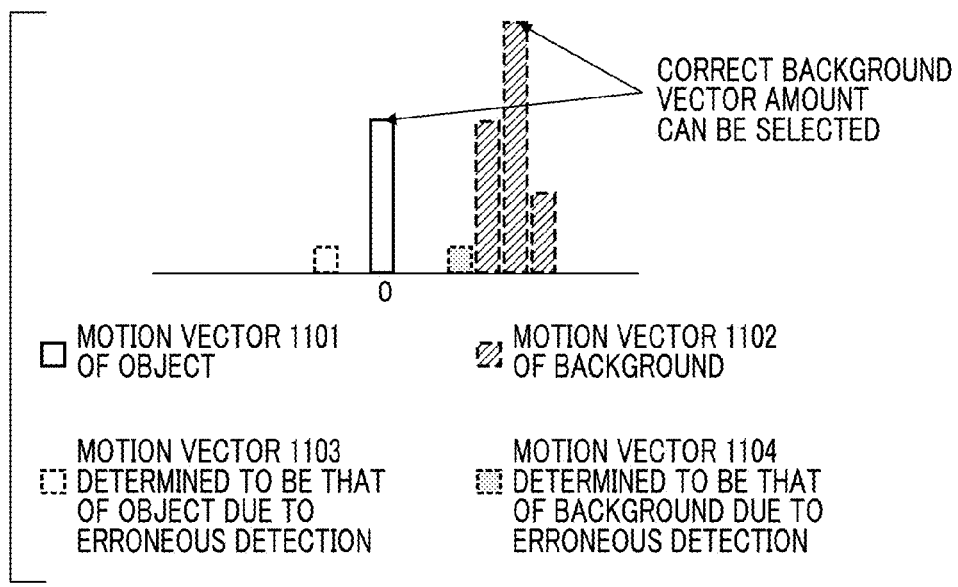
FIG. 5 is an example of a detection of a motion vector.
Figure 7:
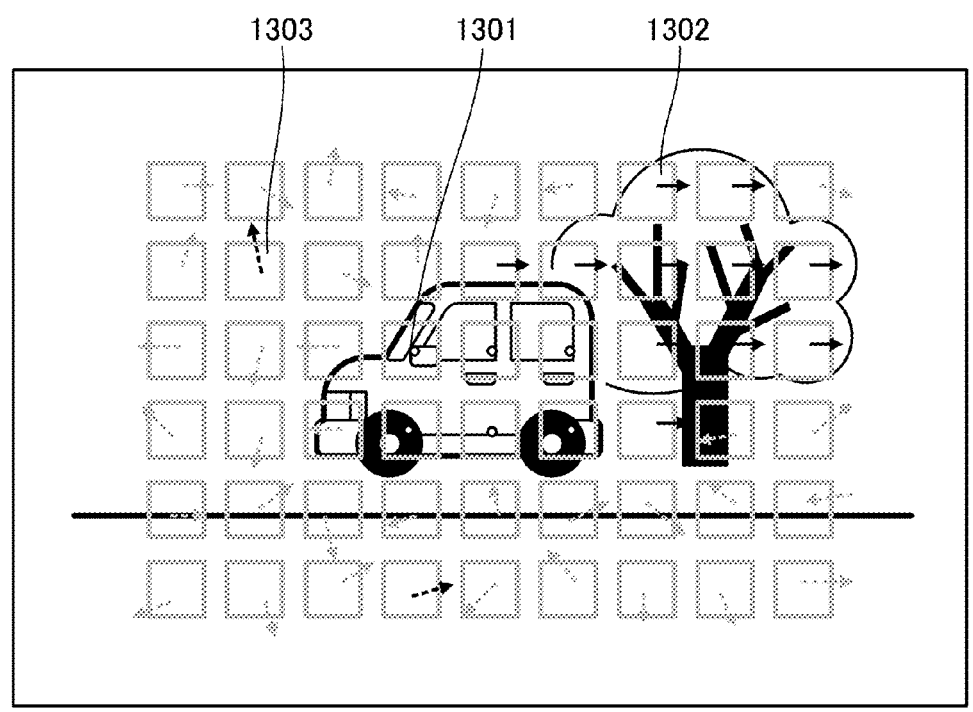
FIG. 7 is a diagram illustrating an area of an object serving as a detection target of the motion vector.

A motion vector of the object output from the motion vector detection unit 141 when the photographer performs panning is of four types as illustrated in FIG. 5. A first motion vector is a motion vector 1101 corresponding to a main object (denoted by reference number 1301 in FIG. 7) desired to be photographed by the photographer. A second motion vector is a motion vector 1102 corresponding to a flowing background (denoted by reference number 1302 in FIG. 7). A third motion vector is a motion vector 1103 corresponding to a moving object within a screen other than a main object. The motion vector 1103 is a motion vector determined to be that of the main object according to erroneous detection. A fourth motion vector is a motion vector 1104 determined to be that of the background according to erroneous detection. In FIG. 7, reference number 1303 denotes an erroneously detected motion vector. Data of a smallest motion amount is likely to be a motion vector of the main object among the detected four types of motion vectors and a value of this motion vector becomes a movement amount on an image plane of the main object.

Figure 6:
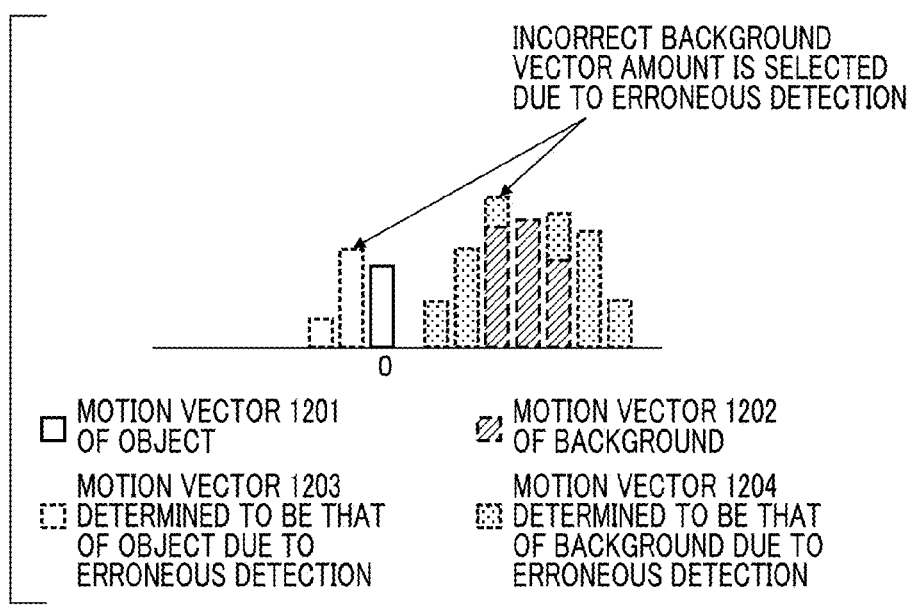
FIG. 6 is an example of a detection of a motion vector.

When the erroneously detected motion vector is small as in the detection example illustrated in FIG. 5, it is possible to select peaks of correct motion vectors of the main object and the background. However, the following event occurs when the number of erroneously detected motion vectors is large as in the detection example illustrated in FIG. 6. That is, when the number of erroneously detected motion vectors is greater than the number of normally detected motion vectors or when the erroneously detected motion vector is added to the normally detected motion vector, the peak or calculation result of the main object or background motion vector is deviated.

Meanwhile, the angular velocity data received from the lens corresponds to a panning velocity of the camera. Accordingly, the camera microcomputer 132 calculates a difference between the angular velocity data received from the lens and an angular velocity calculated from the movement amount on the image plane of the main object and a current focal length of the lens. The result becomes the angular velocity data of the main object for the camera. The camera microcomputer 132 transmits the calculated angular velocity data of the main object to the lens microcomputer 113.

Figure 8:
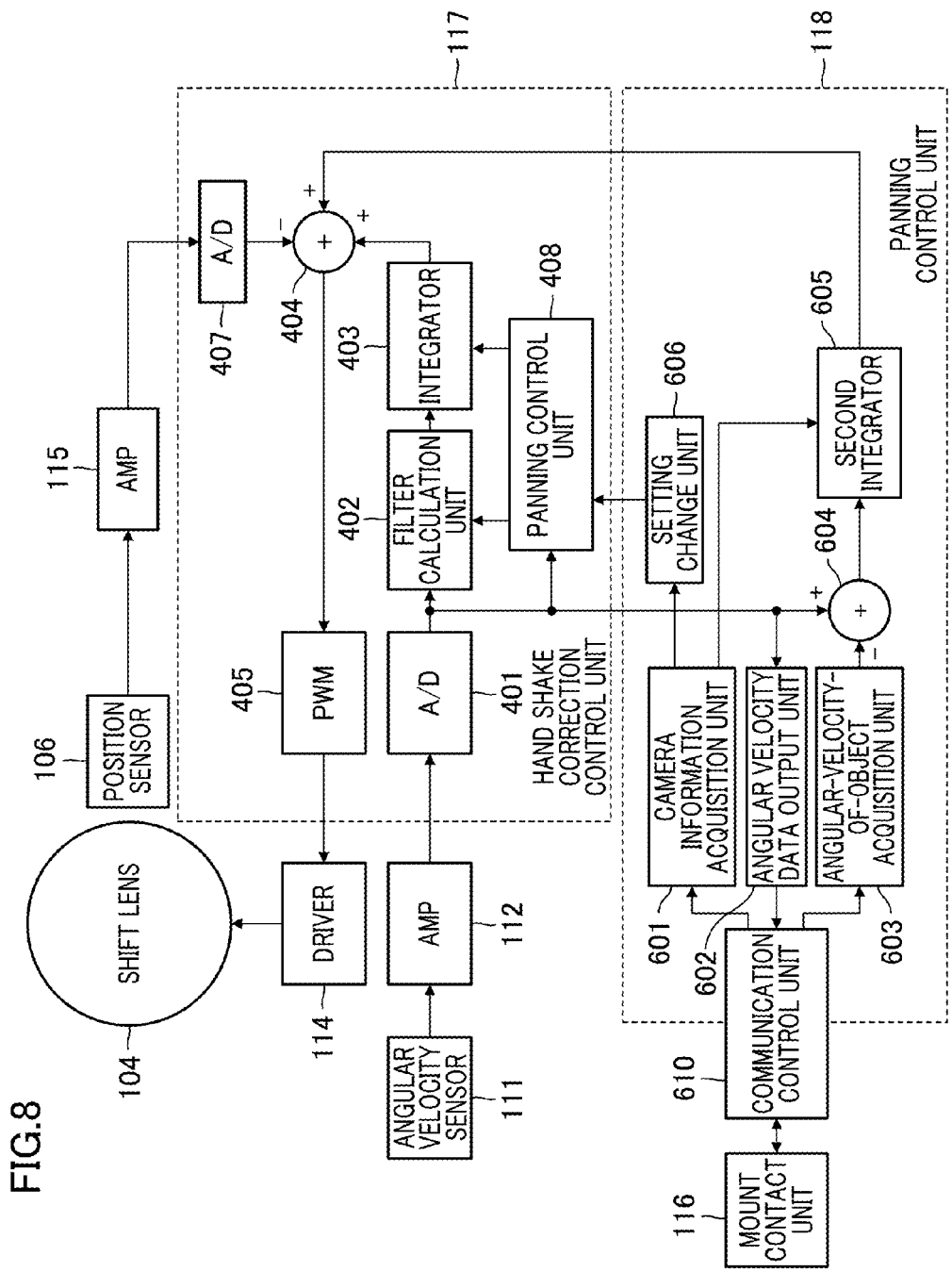
FIG. 8 is a configuration diagram related to shift lens driving control within an interchangeable lens.

FIG. 8 is a configuration diagram related to the shift lens driving control within the interchangeable lens during the panning assist mode.

In FIG. 8, elements common to FIGS. 1 and 2 are denoted by the same reference numbers. The panning control unit 118 includes a camera information acquisition unit 601, an angular velocity data output unit 602, an angular-velocity-of-object acquisition unit 603, an adder 604, a second integrator 605, and a setting change unit 606. The camera information acquisition unit 601 acquires setting information and release information of the panning assist mode.

The angular velocity data output unit 602 samples angular velocity data at a predetermined timing and outputs the sampled angular velocity data to the camera microcomputer 132. The angular-velocity-of-object acquisition unit 603 acquires angular velocity information of the main object necessary for the panning assistance from the camera information obtained through communication. The adder 604 calculates a difference between the angular velocity data and angular velocity data of the object. The second integrator 605 performs an integral operation for only a predetermined period. The communication control unit 610 is provided in the lens microcomputer 113 and performs bidirectional communication with the camera microcomputer 132.

The panning determination unit 153 integrates the angular velocity data transmitted from the lens microcomputer 113 to hold the integrated angular velocity data. Thereby, when a user performs the panning, it is possible to obtain an angle change (hereinafter, panning angle) of the camera using a predetermined timing as a starting point.

When the panning assist mode is set according to the switch operation of the camera main body, mode information is read by the camera information acquisition unit 601 from the communication control unit and reported to the setting change unit 606. The setting change unit 606 performs the setting change of the panning control unit 407 according to the reported mode information. The setting change performed here is a change to facilitate transition to a rapid panning state. Specifically, the setting change unit 606 changes the above-described predetermined values A and B for panning determination.

When the movement angular velocity information of the main object transmitted from the camera main body to the lens microcomputer 113 is acquired by the angular-velocity-of-object acquisition unit 603, the adder 604 calculates a difference between the angular velocity data detected by the angular velocity sensor 111 and the movement angular velocity information of the main object. A calculation result is transmitted to the second integrator 605.

The second integrator 605 starts an integral operation according to a signal indicating that an exposure period is in progress acquired by the camera information and outputs a value in which a position of the shift lens is at a center for the other period. Here, when the shift lens is arranged at the center position outside the exposure period, the shift lens rapidly moves from a current shift lens position to the center position at the time of an exposure period ending. However, a period immediately after the exposure period ending is a period in which a picture is missing from the LCD because reading from the sensor is performed and the motion of an image due to the rapid movement of the shift lens is not affected. In addition, the output of the second integrator 605 is added with the output of the integrator 403 and the shift lens position information in the adder 404 and a drive signal of the shift lens is calculated.

When the panning operation is actually performed by the photographer while the panning assist mode is set, the panning control unit 407 immediately performs panning control for a rapid pan state within the interchangeable lens and a shake correction operation is prohibited. The shift lens corrects an amount corresponding to a difference between an angular velocity during panning of the camera and the angular velocity of the object. Accordingly, a difference between the panning velocity of the camera and the object during the exposure period serving as a cause of a panning failure is offset by the operation of the shift lens and the panning succeeds.

Figure 9:
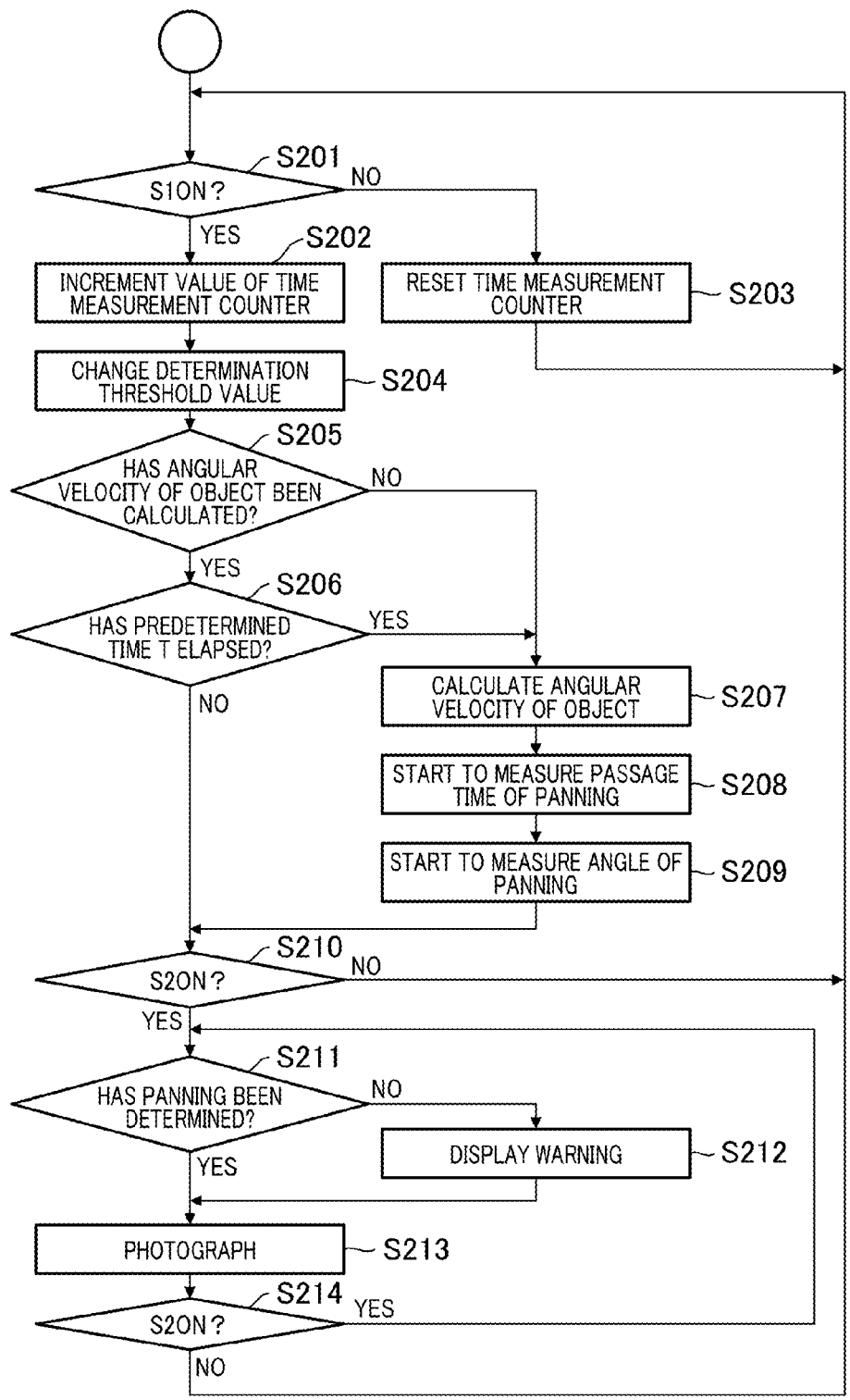
FIG. 9 is a flowchart illustrating an operation process of a camera microcomputer during a panning assist mode.

FIG. 9 is a flowchart illustrating an operation process of a camera microcomputer during the panning assist mode.

In S201, the camera microcomputer 132 determines that the release switch is half pressed. When the release switch is not half pressed, the process proceeds to S203. In S203, the camera microcomputer 132 resets a time measurement counter until the release switch is half pressed. When the release switch is half pressed, the process proceeds to S202. The camera microcomputer 132 increments a value of the time measurement counter.

Next, in S204, the camera microcomputer 132 changes a determination threshold value of the motion vector. Based on the changed determination threshold value, the vector determination unit 145 determines which of the motion vector output from the main object, the motion vector output from the background, the motion vector output from another moving object, and an erroneously detected motion vector corresponds to the motion vector. Thereby, the precision of the motion vector for use in the object velocity calculation (S207) is improved so that the influence of the erroneously detected motion vector is not large.

Next, in S205, the camera microcomputer 132 determines whether the movement angular velocity of the main object has already been calculated. When the movement angular velocity of the main object has already been calculated, the process proceeds to S206. When the movement angular velocity of the main object has not been yet calculated, the process proceeds to S207.

In S206, the camera microcomputer 132 determines whether the time measurement counter has reached a predetermined time T. When the time measurement counter has not reached the predetermined time T, the process proceeds to S210. When the time measurement counter has reached the predetermined time T, the process proceeds to S207. In S207, the camera microcomputer 132 calculates an angular velocity of the main object. Here, re-calculating the angular velocity of the main object is a process considering the case in which the velocity of the main object changes with time. The angular velocity of the main object calculated in S207 is transmitted to the lens microcomputer 113 every time the angular velocity of the main object is calculated.

Next, in S208, the camera microcomputer 132 starts measurement by resetting the panning angle integrated in the panning determination unit 153. Subsequently, in S209, the camera microcomputer 132 determines whether the release switch is fully pressed. When the release switch is not fully pressed, the process returns to S201.

When the release switch has been fully pressed, the process proceeds to S211. The camera microcomputer 132 performs a panning determination process. When panning is allowed, the process proceeds to S213. Photographing is performed in a current camera setting state. When the panning is not allowed, the process proceeds to S212. The camera microcomputer 132 displays a warning on the LCD 172 and the process proceeds to S213.

Next, in S214, the camera microcomputer 132 determines whether the release switch has been fully pressed. When the release switch has been fully pressed, the process returns to S211 and the next photographing starts. When the release switch has not been fully pressed, the process returns to S201.

Figure 10:
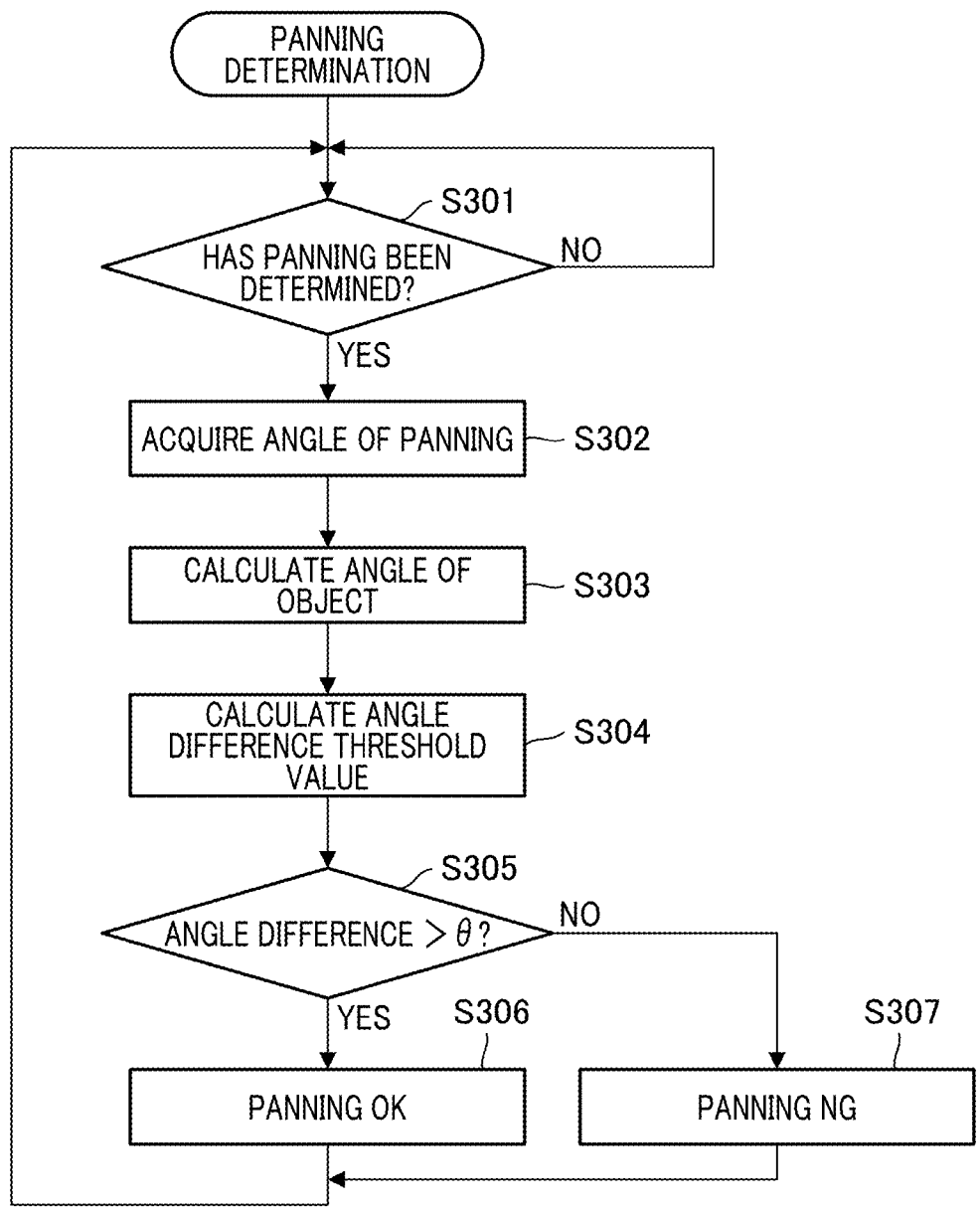
FIG. 10 is a flowchart illustrating a panning determination process.

FIG. 10 is a flowchart illustrating the panning determination process to be executed by the panning determination unit within the camera microcomputer.

In S301, the panning determination unit 153 determines whether the camera is in the panning assist mode. When the camera is not in the panning assist mode, the process returns to S301. When camera is in the panning assist mode, the process proceeds to S302.

In S302, the panning determination unit 153 acquires a panning angle. In S303, the panning determination unit 153 calculates an object angle (predicted object angle) of the case in which the object is maintained at the angular velocity of the object from the angular velocity of the object and the elapsed panning time. Subsequently, in S304, the panning determination unit 153 calculates a threshold value (panning threshold value) of an angle for performing the panning determination. The panning threshold value decreases as the focal length increases (an angle of view decreases). In this example, the panning threshold value becomes an angle of view calculated from the focal length.

In S305, the panning determination unit 153 determines whether an absolute value of a difference between the predicted object angle and the panning angle is greater than a panning threshold value θ. When the absolute value of the difference between the predicted object angle and the panning angle is greater than the panning threshold value θ, the process proceeds to S306. When the absolute value of the difference between the predicted object angle and the panning angle is less than or equal to the panning threshold value θ, the process proceeds to S307.

In S306, the panning determination unit 153 allows the panning. In S307, the panning determination unit 153 notifies the lens microcomputer 113 of the release of the panning assist mode without allowing panning photographing.

Figures 11, 12:
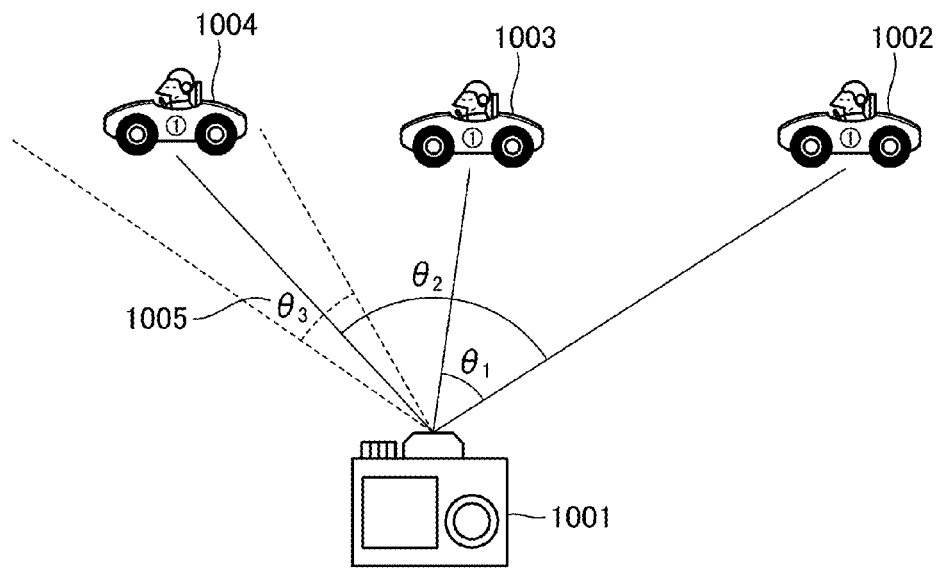
FIG. 11 is a diagram illustrating a control by a panning determination unit.
FIG. 12 is an example of a determination threshold value.

FIG. 11 is a diagram illustrating a control by the panning determination unit.

Reference number 1001 denotes a camera. Reference number 1002 denotes a position of the object at the time at which the angular velocity of the object has been calculated. Reference number 1003 denotes a position of the object when the object has moved at the calculated angular velocity of the object. An angle from the position 1002 to the position 1003 is assumed to be a virtual object angle θ1. Reference number 1004 denotes an actual position of the object calculated from the information from the angular velocity sensor 111. An angle from the position 1002 to the position 1004 is assumed to be the panning θ2. Reference number 1005 denotes an angle θ3 of a view during photographing. Accordingly, when θ3 is less than |θ1-θ2|, the panning determination unit 153 performs a determination to allow panning assist photographing.

Next, a process of changing a threshold serving as a criterion of a determination of the motion vector (hereinafter simply referred to as a "determination threshold value") in S204 of FIG. 9 will be described.

In this embodiment, a plurality of determination threshold values are stored in a storage unit as illustrated in FIG. 12 in order to determine the motion vector as that of a main object, a background, another moving object, or erroneous detection during a panning operation. The camera microcomputer 132 executes the determination of the motion vector using the determination threshold value stored in the storage unit. In this embodiment, the determination threshold value is set to any one of α1 to α7 according to the state of the camera. In addition, in this embodiment, each determination threshold value is strictly or loosely set according to a determination target of the motion vector. For example, the determination threshold value α1 is a determination threshold value to be set when the camera is in a state in which acceleration is in progress at the initiation of panning photographing. In this state, the determination threshold value α1 is strictly set for the main object and the background. Thereby, it is possible to reduce the influence of the determined motion vector on the angular velocity calculation of the main object.

Figure 13:
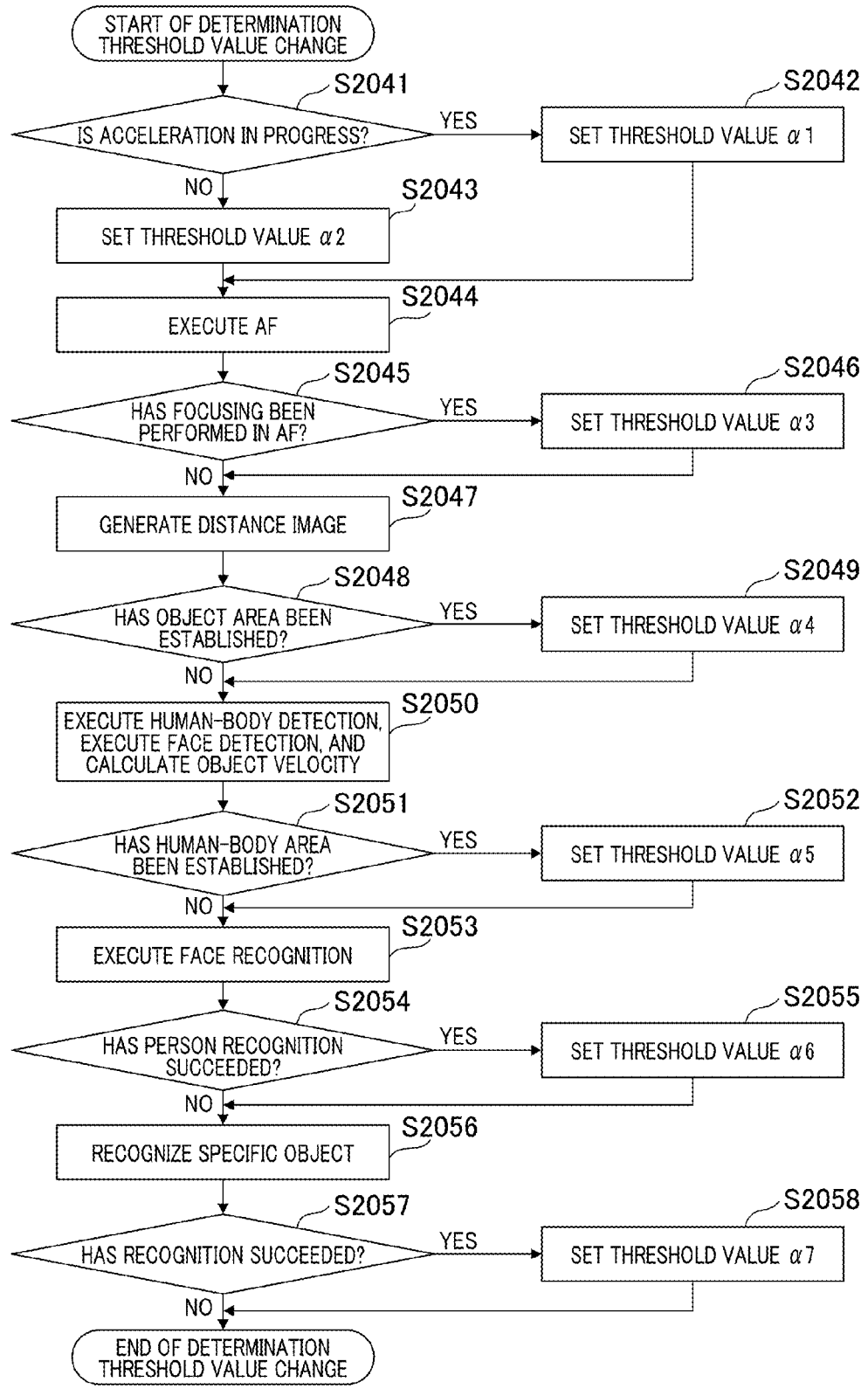
FIG. 13 is a flowchart illustrating a timing at which the determination threshold value changes.

FIG. 13 is a flowchart illustrating a timing at which the determination threshold value of the motion vector changes.

In S2041, the camera microcomputer 132 determines whether the state of the camera indicates that acceleration is in progress with the start of tracking of the object at a point in time at which the panning operation has started. When the acceleration is in progress, a possibility of tracking the object is low. Accordingly, in S2042, the camera microcomputer 132 sets α1 as the determination threshold value. When the acceleration is not in progress and a constant-velocity operation is in progress, the camera microcomputer 132 sets α2 as the determination threshold value in S2043.

Next, in S2044, the camera microcomputer 132 executes auto-focus (AF) (automatic focus adjustment operation). In S2045, the camera microcomputer 132 determines whether the object is in focus. When the object is in focus, the camera microcomputer 132 sets α3 as the determination threshold value in S2046. When the object is not in focus, the camera microcomputer 132 generates a distance image in S2047.

In S2048, the camera microcomputer 132 determines whether an area of the object is established from the generated distance image. When the area of the object is established, the camera microcomputer 132 sets α4 as the determination threshold value in S2049. When the area of the object is not established, the process proceeds to S2050.

Next, in S2050, the camera microcomputer 132 executes a human-body detection process, a face detection process, and object velocity calculation from a captured image. Subsequently, in S2051, the camera microcomputer 132 determines whether an area of a human body is established. When the area of the human body is established, the camera microcomputer 132 sets α5 as the determination threshold value. When the area of the human body is not established, the process proceeds to S2053.

In S2050, the camera microcomputer 132 executes face recognition. Subsequently, the camera microcomputer 132 determines whether recognition of a specific person has succeeded. When the recognition of the specific person has succeeded, the camera microcomputer 132 sets α6 as the determination threshold value. When the recognition of the specific person has failed, the process proceeds to S2056.

Next, in S2056, the camera microcomputer 132 executes the recognition of the specific object. The camera microcomputer 132 executes the recognition of the specific physical object using a specific-physical-object detection algorithm such as SHIFT. In S2057, the camera microcomputer 132 determines whether the recognition of the specific physical object has succeeded. When the recognition of the specific object has succeeded, the camera microcomputer 132 sets α7 as the determination threshold value. When the recognition of the specific physical object has failed, the process ends.

Figure 14:
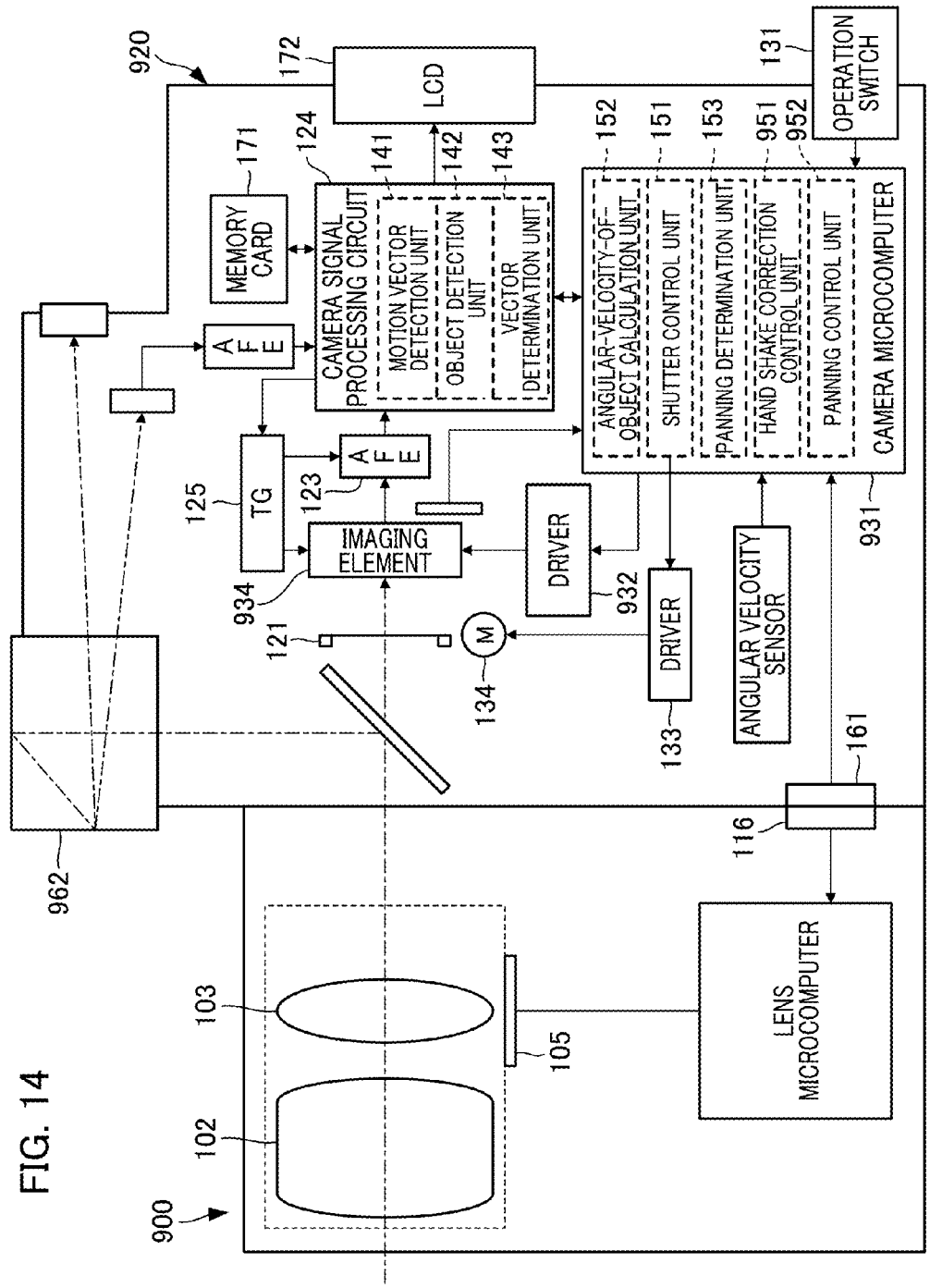
FIG. 14 is a configuration example of a camera system.

The operation of the camera system illustrated in FIG. 1 has been described above, but the camera system can also have a configuration illustrated in FIG. 14. The camera system illustrated in FIG. 14 includes an interchangeable lens 900 and a camera main body 902. In the example illustrated in FIG. 14, the camera microcomputer 931 optically corrects the shake of an image in an optical axis due to the shake of the image pickup apparatus by driving the imaging element 934 in a direction perpendicular to the optical axis via the driver 932. In addition, the camera microcomputer 931 includes a camera shake correction control unit 951 having a similar function to the camera shake correction control unit 117 provided in the lens microcomputer 113 of FIG. 1. In addition, the camera microcomputer 931 includes a panning control unit 952 having a similar function to the panning control unit 18 provided in the lens microcomputer 113 of FIG. 1. In the configuration illustrated in FIG. 14, it is possible to implement the image shake correction device through at least the camera signal processing circuit 124, the camera microcomputer 931, and the imaging element 934.

(Embodiment 1)

Figure 15:
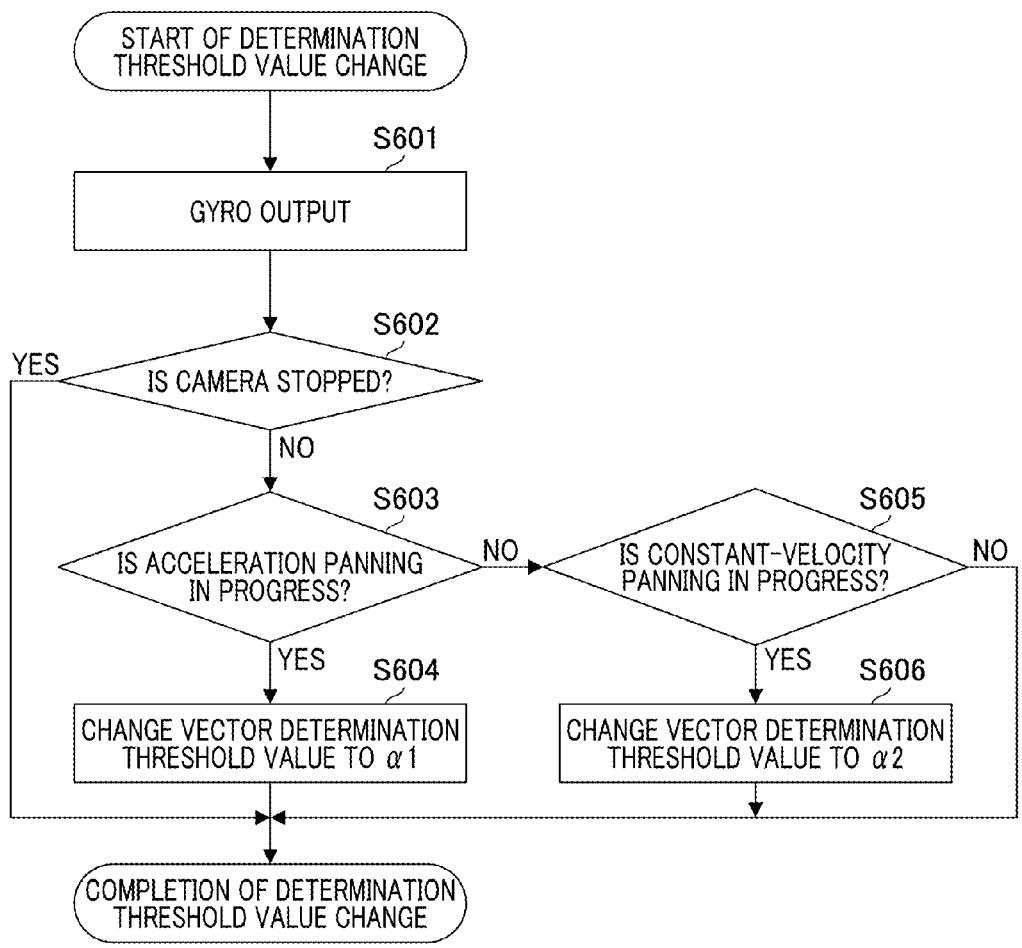
FIG. 15 is a flowchart illustrating a change process on the determination threshold value of the motion vector.

FIG. 15 is a flowchart illustrating a change process on a determination threshold value of the motion vector in Embodiment 1.

First, in S601, the camera microcomputer 132 acquires an output from a gyro including information indicating a state of the camera. Subsequently, in S602, the camera microcomputer 132 determines whether the camera is stopped based on the output obtained from the gyro. When the camera is stopped, the process ends. When the camera is not stopped, the process proceeds to S603.

In S603, the camera microcomputer 132 determines whether the state of the camera indicates that an acceleration operation at the initiation of panning photographing (at the initiation of a panning operation) is in progress based on an output obtained from the gyro. When the state of the camera indicates that the acceleration operation at the initiation of the panning photographing is in progress, the process proceeds to S604. In S604, the camera microcomputer 132 sets α1 of FIG. 12 as the determination threshold value.

When the state of the camera indicates that the acceleration operation at the initiation of the panning photographing is not in progress, the process proceeds to S605. In S605, the camera microcomputer 132 determines whether the camera is performing a constant-velocity operation in a stable state by tracking the object based on the output obtained from the gyro. When the camera is not performing the constant-velocity operation, the process ends. When the camera is performing the constant-velocity operation, the process proceeds to S606. In S604, the camera microcomputer 132 sets α2 of FIG. 12 as the determination threshold value.

In this embodiment, the camera system changes the determination of a motion vector for use in the calculation of an angular velocity of the main object according to the state of the camera (during acceleration, during constant velocity, or the like) in the assistance of the panning photographing for the user. Thereby, it is possible to properly determine motion vectors of the main object, the background, another moving object, and erroneous detection. It is possible to precisely calculate an angular velocity of the main object and perform the assistance of high performance panning photographing for the user. Further, calculation is performed after waiting a predetermined time T to perform angular velocity calculation of the main object, but it is possible to minimize the predetermined time T if the determination of the motion vector can be precisely performed. As a result, the assistance of the panning photographing is possible immediately after a panning operation for tracking the object starts.

(Embodiment 2)

Figure 16:
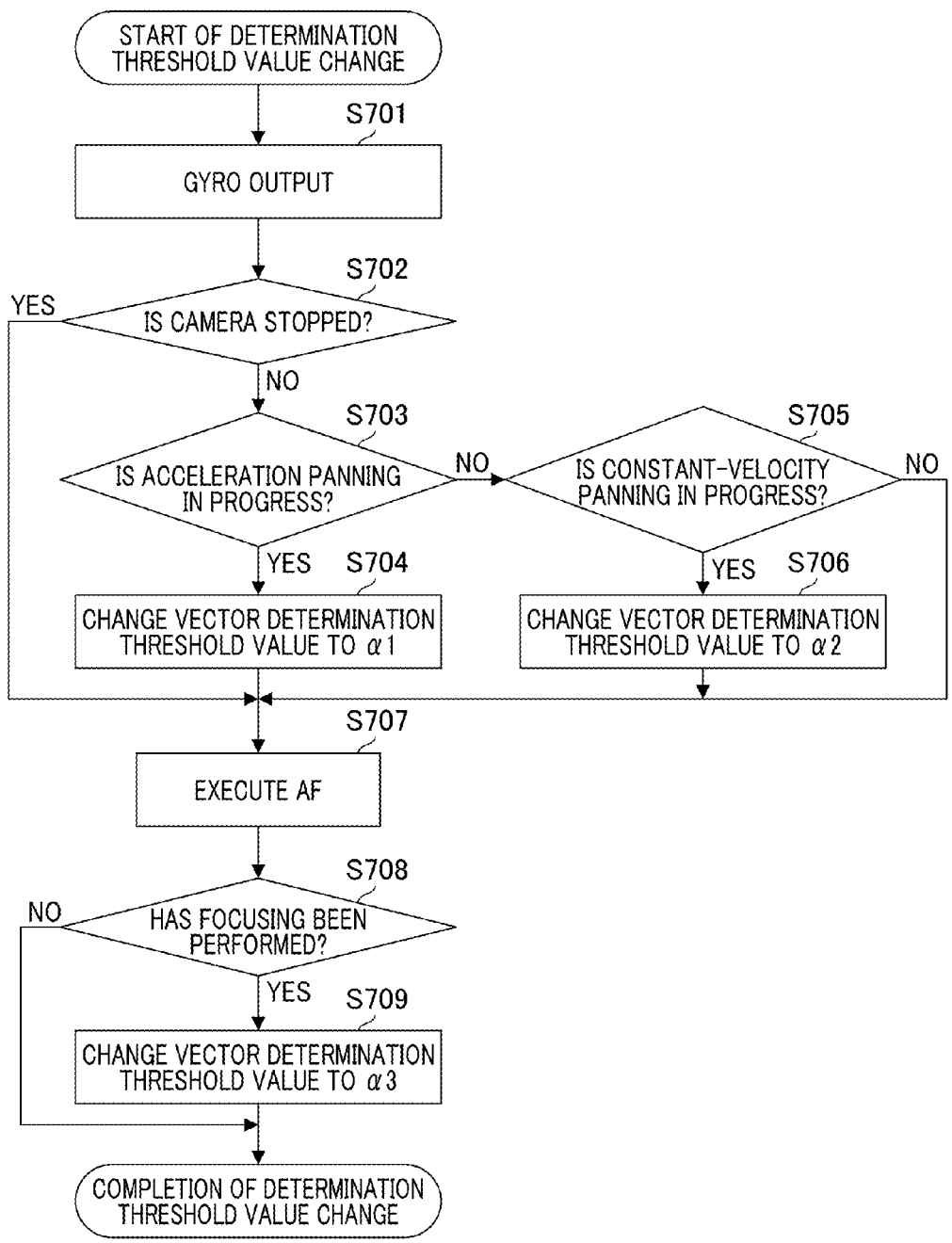
FIG. 16 is a flowchart illustrating a change process on the determination threshold value of a motion vector.

FIG. 16 is a flowchart illustrating a change process on a determination threshold value of the motion vector in Embodiment 2.

S701 to S706 are similar to S601 to S606 of FIG. 15.

In S707, the camera microcomputer 132 executes AF that automatically performs an operation of forming an image of the object in the imaging element 122 according to an S1ON operation (S201 of FIG. 9) during panning.

Next, in S708, the camera microcomputer 132 determines whether the object is in focus. When the object is not in focus, the process ends. When the object is in focus, the process proceeds to S709. In S709, the camera microcomputer 132 sets α3 (FIG. 12) as the determination threshold value.

Figure 17:
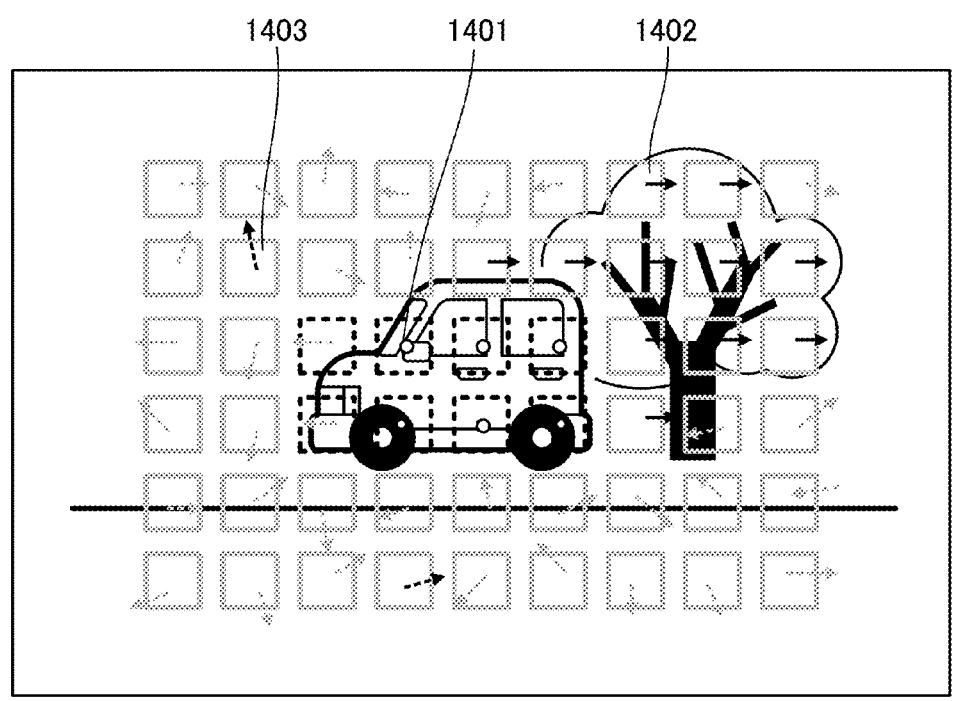
FIG. 17 is a diagram illustrating an area of an object serving as a detection target of the motion vector.

In Embodiment 2, it is possible to know a certain area of the object having an image formed at an angle of view according to the process of S707. The camera microcomputer 132 determines the certain area of the object of the formed image as the main object (denoted by reference number 1405 of FIG. 17) and changes the threshold value of the determination of the motion vector to α3 in each of the certain area of the object and an area other than the certain area. Thereby, it is possible to precisely execute the determination of the main object (denoted by reference number 1401 of FIG. 17), the background (denoted by reference number 1402 of FIG. 17), another moving object, and an erroneously detected motion vector (denoted by reference number 1403 of FIG. 17). According to this embodiment, it is possible to precisely calculate the angular velocity of the main object and perform the assistance of the panning photographing for the user by setting the determination threshold value α3 of the motion vector in each of an area where focusing has been set by AF and another area and precisely calculating the angular velocity of the main object.

(Embodiment 3)

Figure 18:
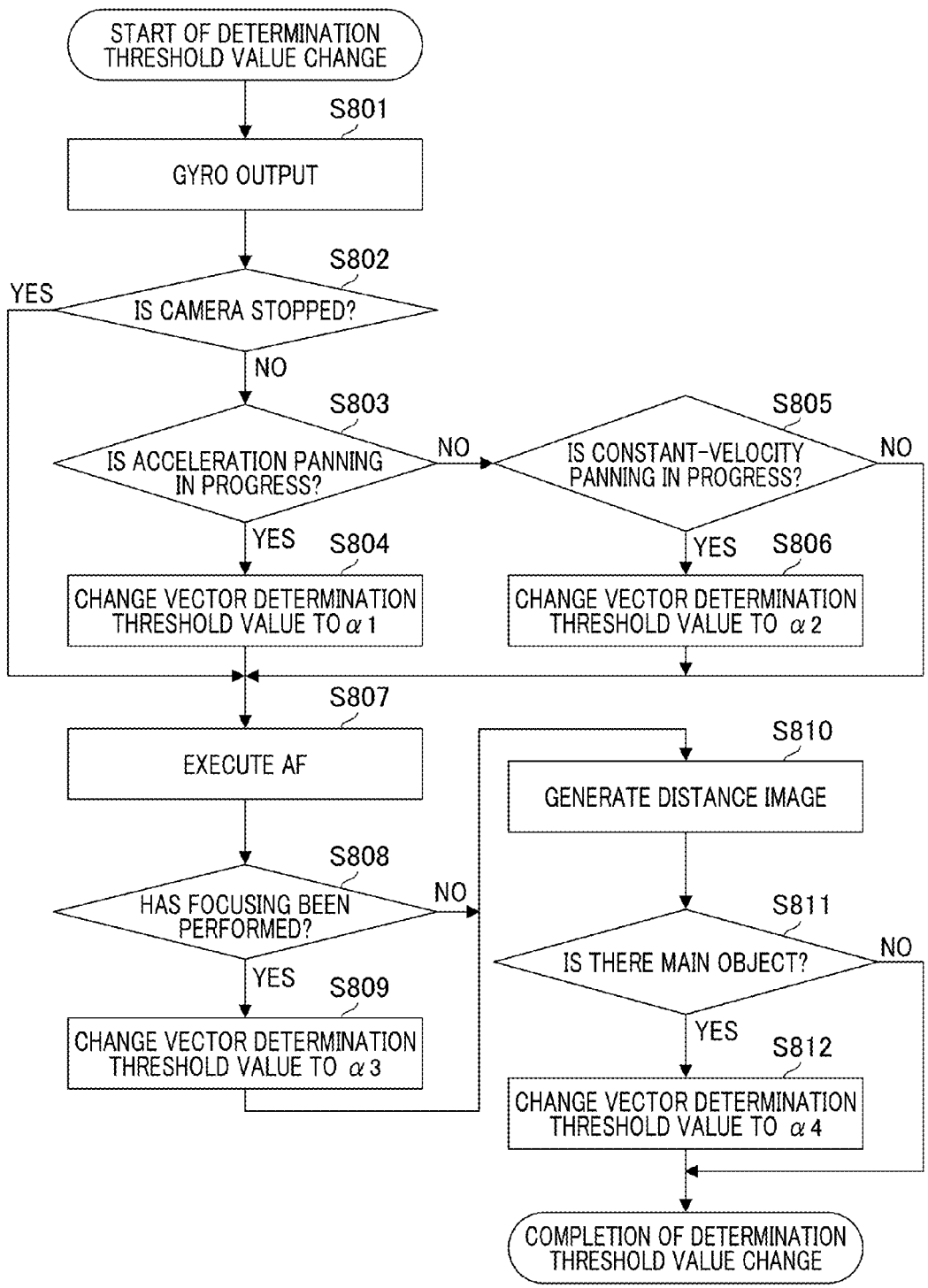
FIG. 18 is a flowchart illustrating a change process on a determination threshold value of a motion vector.

FIG. 18 is a flowchart illustrating a change process on a determination threshold value of the motion vector in Embodiment 3.

S801 to S809 are similar to S701 to S709 of FIG. 16.

Figure 19:
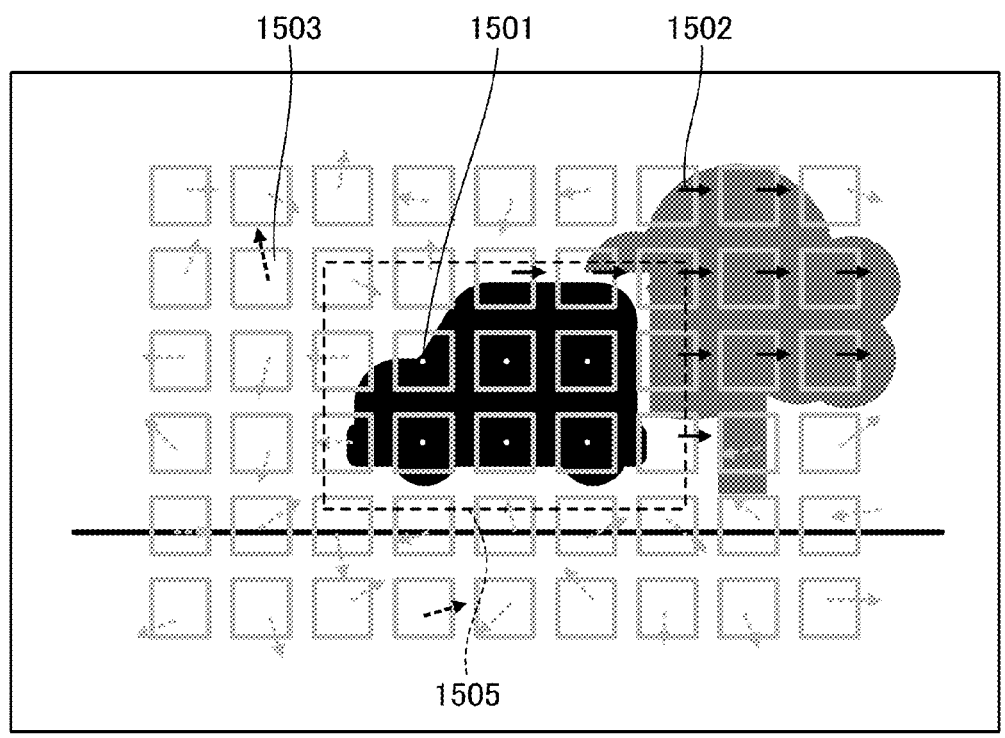
FIG. 19 is a diagram illustrating an area of an object serving as a detection target of the motion vector.

In S810, the camera microcomputer 132 generates a distance image to the object based on an image formed in the imaging element 122 during panning. Subsequently, in S811, it is determined whether there is a pixel area (denoted by reference number 1505 of FIG. 19) where there is a main object based on the distance image. When there is no main object, the process ends. When the main object is present, the process proceeds to S812. In S812, the camera microcomputer 132 sets α4 as the determination threshold value.

In Embodiment 3, the determination threshold value α4 is set in each of the main object area clearly identified from the distance image generated in S810 and an area other than the main object area. Thereby, it is possible to precisely execute the determination of the main object (denoted by reference number 1501 of FIG. 19), the background (denoted by reference number 1502 of FIG. 19), another moving object, and the erroneously detected motion vector (denoted by reference number 1503 of FIG. 19). In this embodiment, it is possible to precisely calculate an angular velocity of the main object by setting the determination threshold value α4 in each of the main object and an area other than that of the main object from the generated distance image to the object.

(Embodiment 4)

Figure 20:
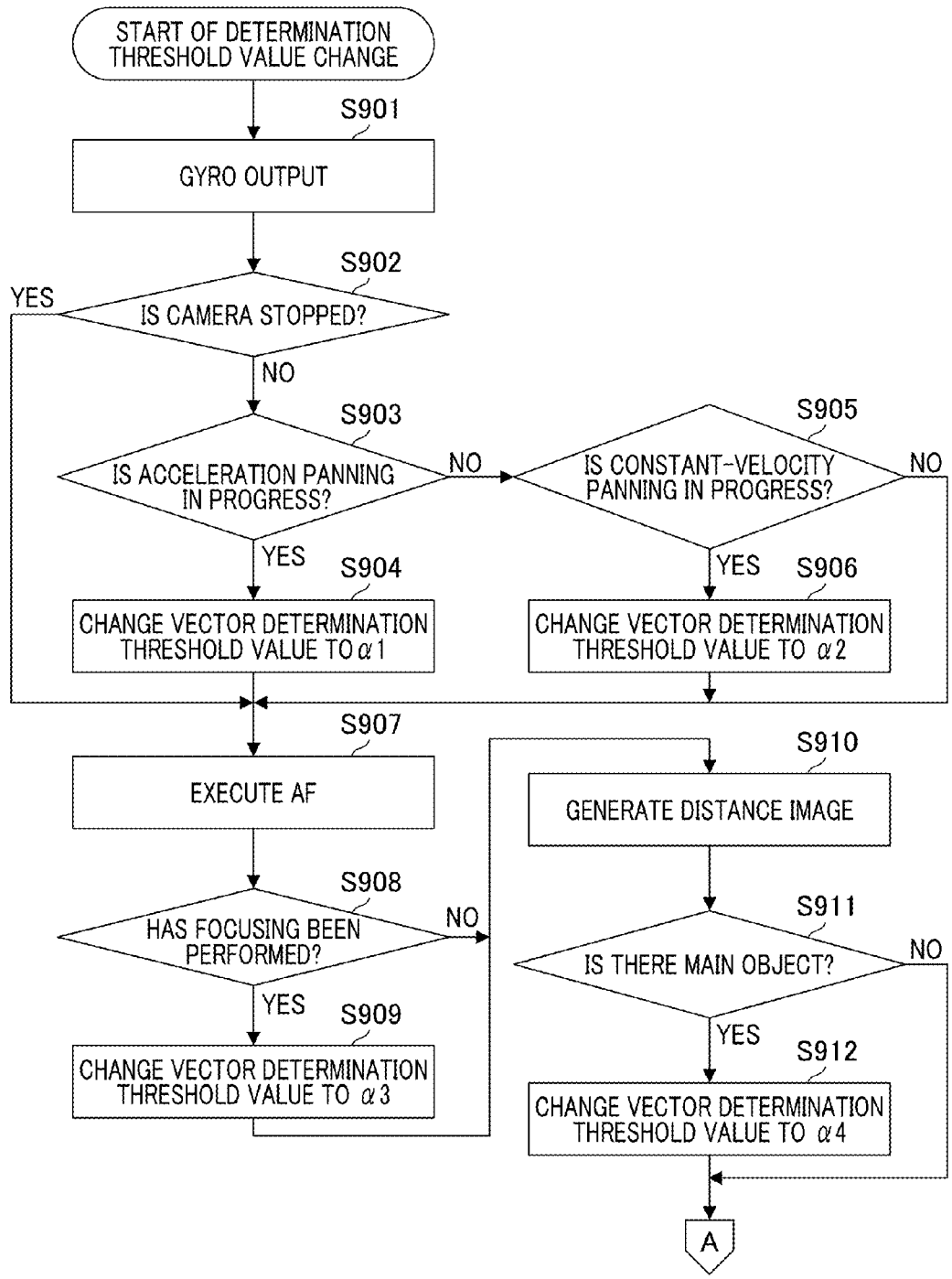
FIG. 20 is a flowchart illustrating a change process on a determination threshold value of a motion vector.
Figure 21:
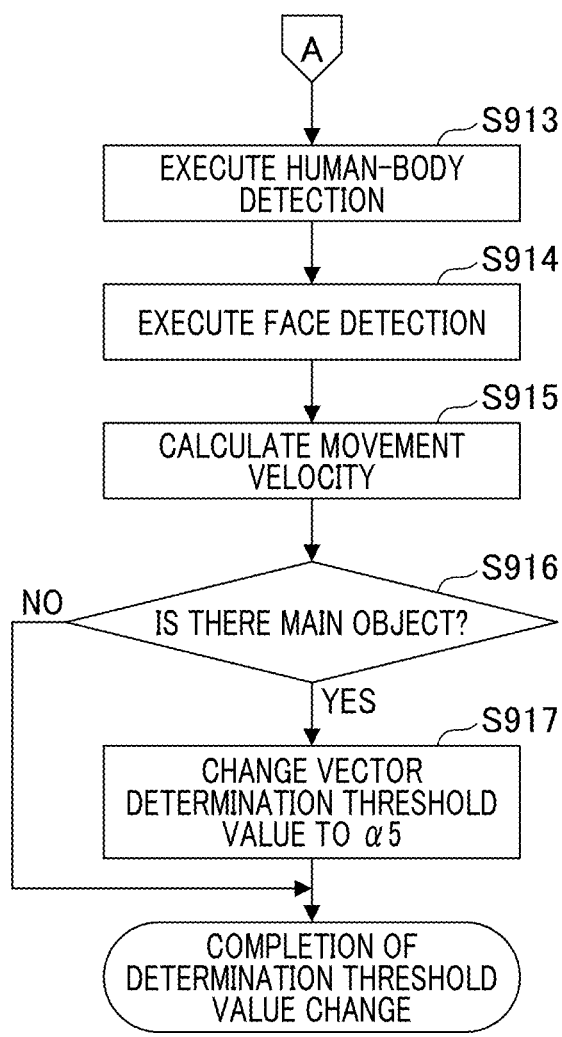
FIG. 21 is a flowchart illustrating a change process on a determination threshold value of the motion vector.

FIGS. 20 and 21 are a flowcharts illustrating a change process on a determination threshold value of the motion vector in Embodiment 4.

S901 to S912 of FIG. 20 are similar to S801 to S812 of FIG. 18.

Figure 22:
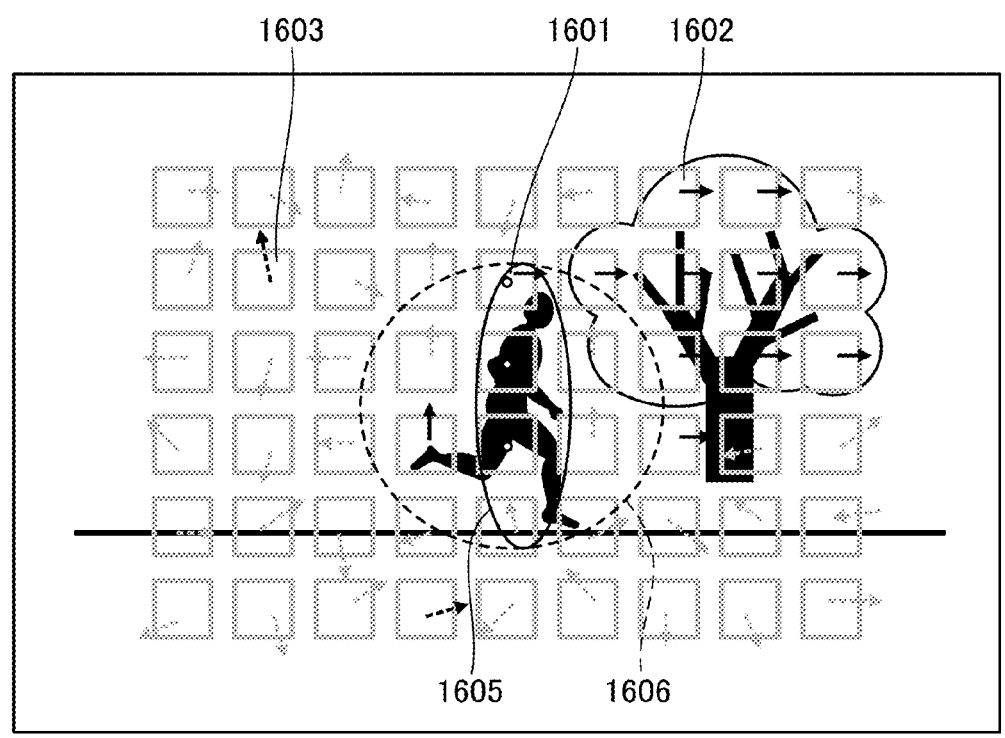
FIG. 22 is a diagram illustrating an area of an object serving as the detection target of the motion vector.

In S913 of FIG. 21, the camera microcomputer 132 applies a human-body detection algorithm embedded in the object detection unit 142 (FIG. 1) to the image formed in the imaging element. Subsequently, in S914, the camera microcomputer 132 applies a face detection algorithm embedded in the object detection unit 142 to the image formed in the imaging element. Thereby, the camera microcomputer 132 detects an area (denoted by reference number 1605 of FIG. 22) where there is a person serving as the main object.

Next, in S915, the camera microcomputer 132 calculates a movement velocity of the person serving as the main object. Subsequently, in S916, the camera microcomputer 132 determines whether the person serving as the main object is detected. When the person serving as the main object is not detected, the process ends. When the person serving as the main object is detected, the process proceeds to S1017. In S1017, the camera microcomputer sets α5 (FIG. 12) as the determination threshold value in each of a main object area and an area other than the main object area detected in the processes of S913 and S914.

Here, when the person moves, the motion vector from which a limb image area is detected is not necessarily limited to a direction in which the person moves, and appears in a direction in which the limb swings. It is not desirable to use the motion vector detected in the limb area in the movement velocity calculation of the person. Accordingly, the camera microcomputer 132 strictly sets the determination threshold value α5 to be set in S917 for an area (denoted by reference number 1606 of FIG. 22) where the limb is present. That is, the determination threshold value α5 is set to a value for which the motion vector detected from the limb area is excluded from the calculation of the angular velocity of the main object. It is possible to reduce the influence on calculation of a movement velocity of the person who is the main object and reduce an error by strictly setting the determination threshold value α5 to perform similar handling to the motion vector of erroneous detection. In addition, the camera microcomputer 132 sets a more proper determination threshold value by changing the size of the area (denoted by reference number 1606 of FIG. 22) as assumed where the limb is present according to the movement velocity of the person detected in S915. When the movement velocity of the person is slow, it is possible to change the determination threshold value for only a proper area by setting a small area.

According to this embodiment, the angular velocity of the main object can be precisely calculated by setting the determination threshold value α5 in each of a main object and an area other than that of the main object detected in a human-body detection process and a face detection process.

(Embodiment 5)

Figure 23:
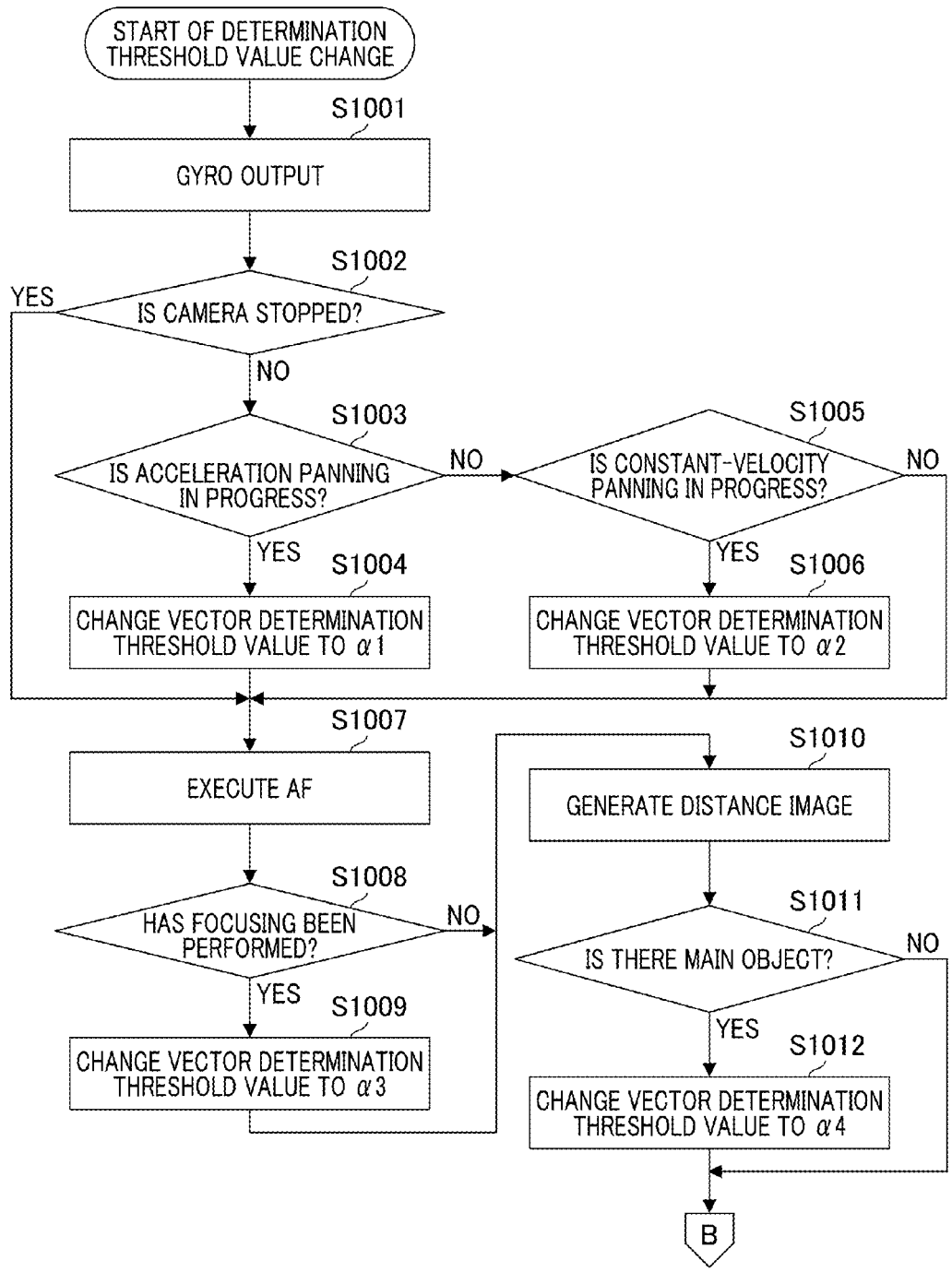
FIG. 23 is a flowchart illustrating a change process on a determination threshold value of a motion vector.
Figure 24:
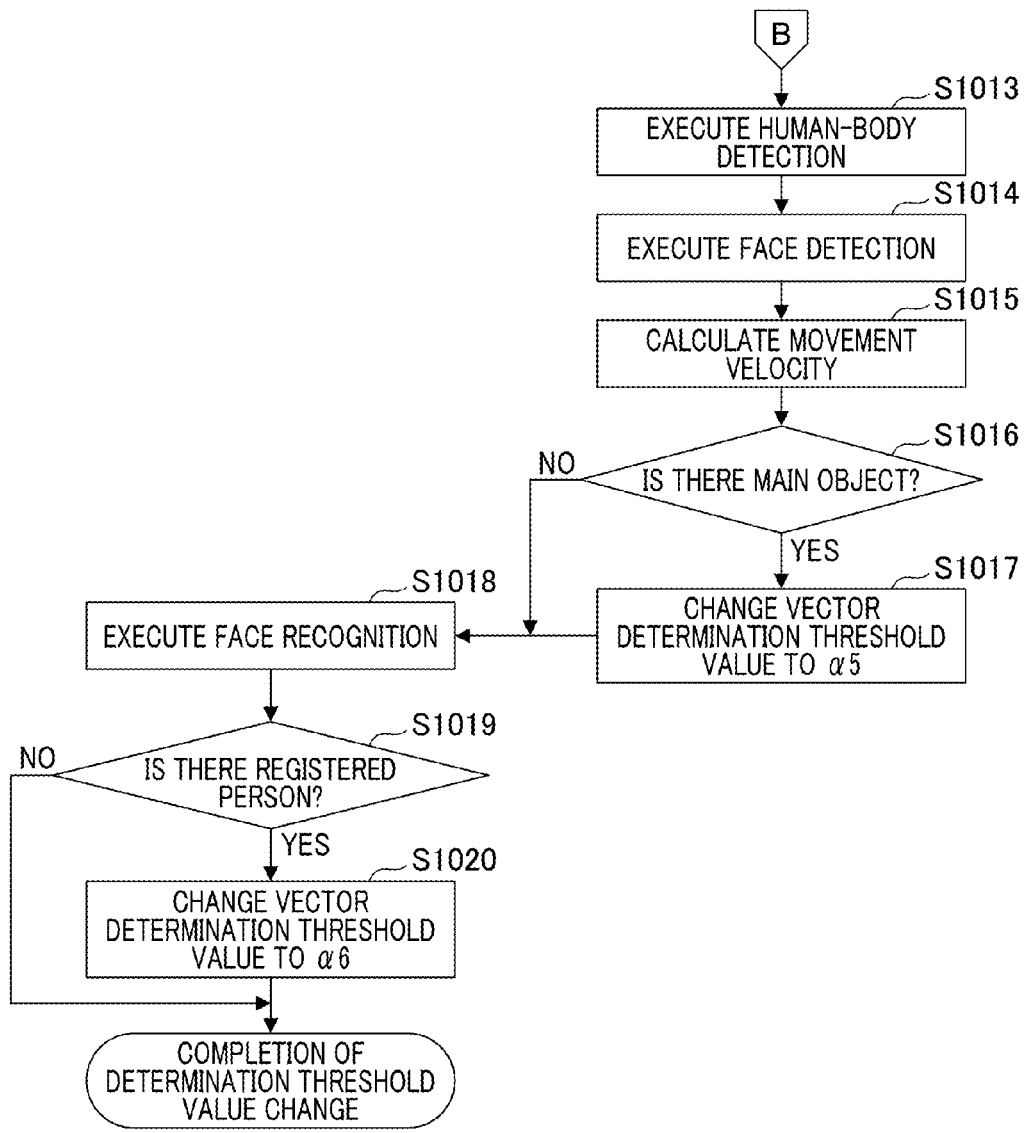
FIG. 24 is a flowchart illustrating a change process on a determination threshold value of the motion vector.

FIGS. 23 and 24 are a flowchart illustrating a process of changing the determination threshold value of the motion vector in Embodiment 5.

S1001 to S1012 of FIG. 23 are similar to S901 to S912 of FIG. 20. In addition, S1013 to S1017 of FIG. 24 are similar to S913 to S917 of FIG. 21.

Figure 25:
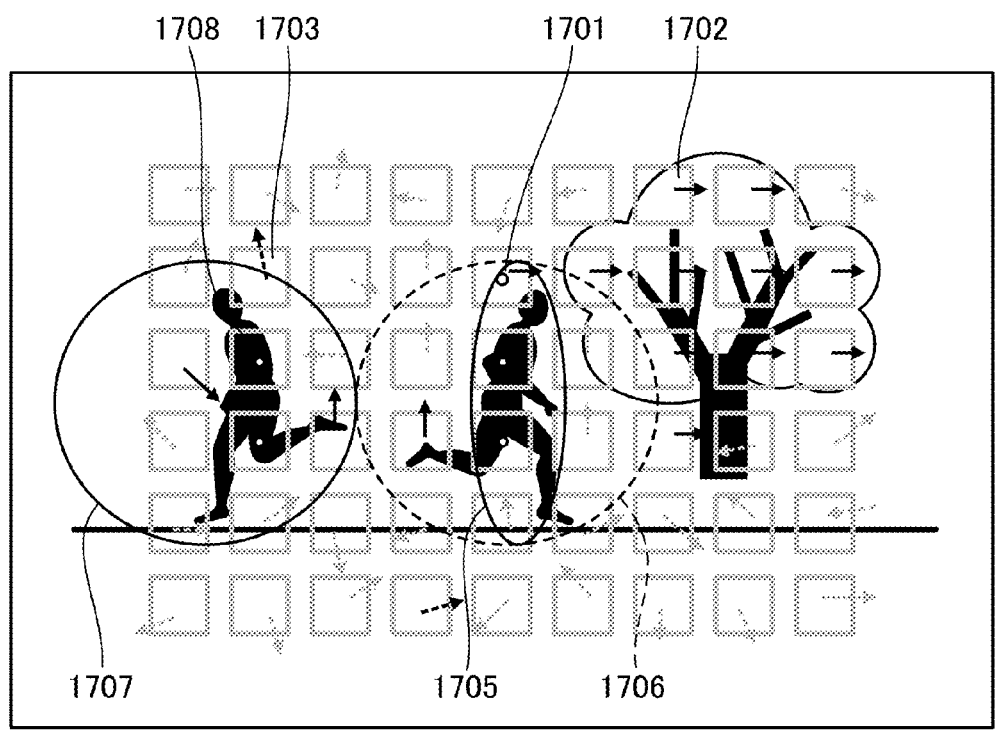
FIG. 25 is a diagram illustrating an area of an object serving as the detection target of the motion vector.

In S1018, the camera microcomputer 132 applies a face recognition algorithm embedded in the object detection unit 142 to an image formed in the imaging element 122 during panning. In S1018, an area (denoted by reference number 1705 of FIG. 25) where there is a specific person serving as the main object is found. In addition, an image area in which there is a person who is not determined to be the main object is also found.

Subsequently, the camera microcomputer 132 determines whether a pre-registered person is detected. When the registered person is not detected, the process ends. When the registered person is detected, the process proceeds to S1020. In S1020, the camera microcomputer 132 sets α6 (FIG. 12) as the determination threshold value. Because an error increases when a motion vector detected in an image area in which there is a person who is not determined to be the main object is applied to the calculation of a movement amount of the main object, it is not proper to use the detected motion vector. Accordingly, the camera microcomputer 132 sets different determination threshold values α6 in a main object area and an area other than the main object area.

According to this embodiment, it is possible to precisely calculate an angular velocity of the main object by setting a plurality of determination threshold values α6 in each of a main object recognized in the face recognition algorithm and an area other than that of the main object.

(Embodiment 6)

Figure 26:
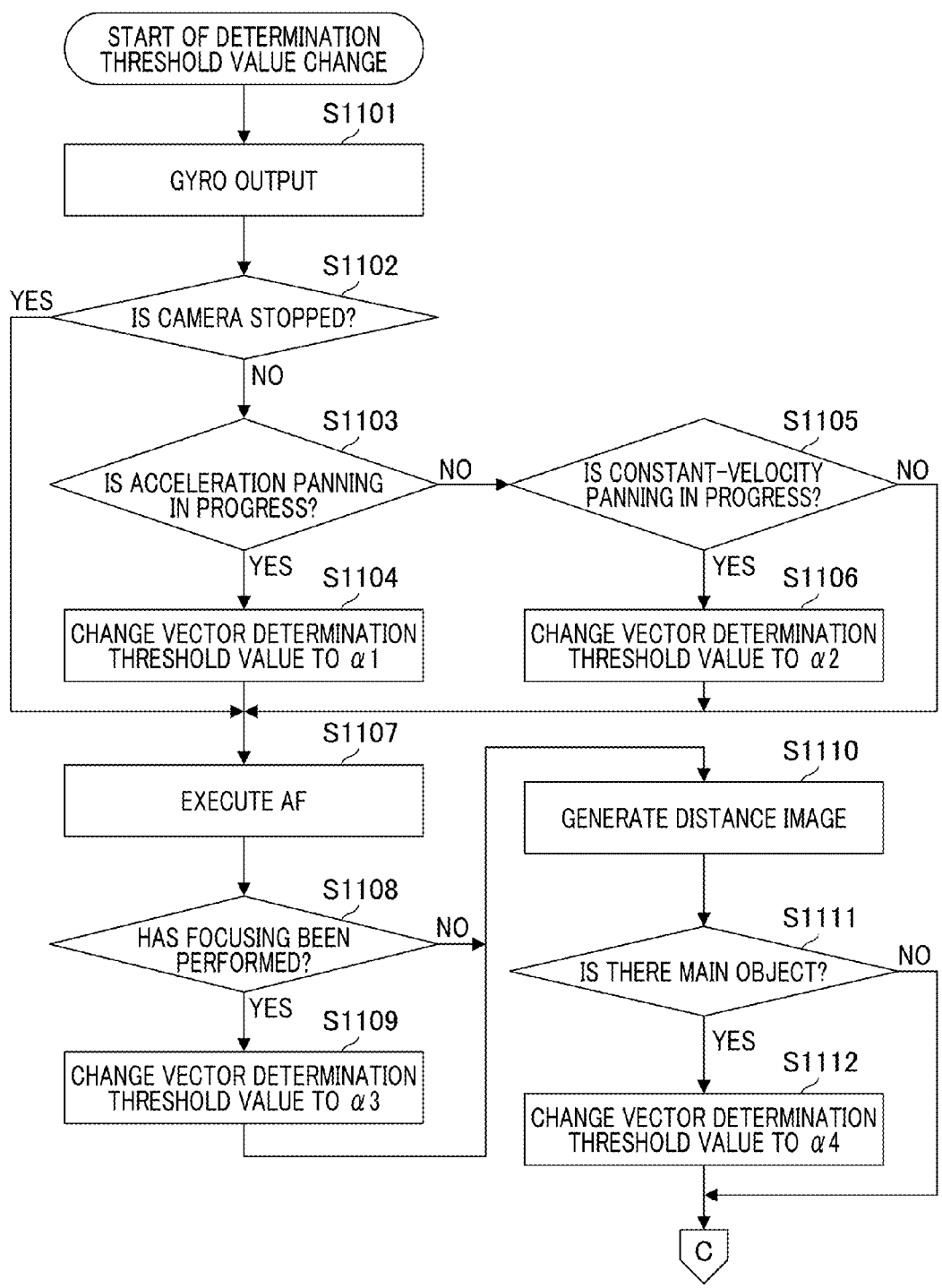
FIG. 26 is a flowchart illustrating a change process on a determination threshold value of a motion vector.
Figure 27:
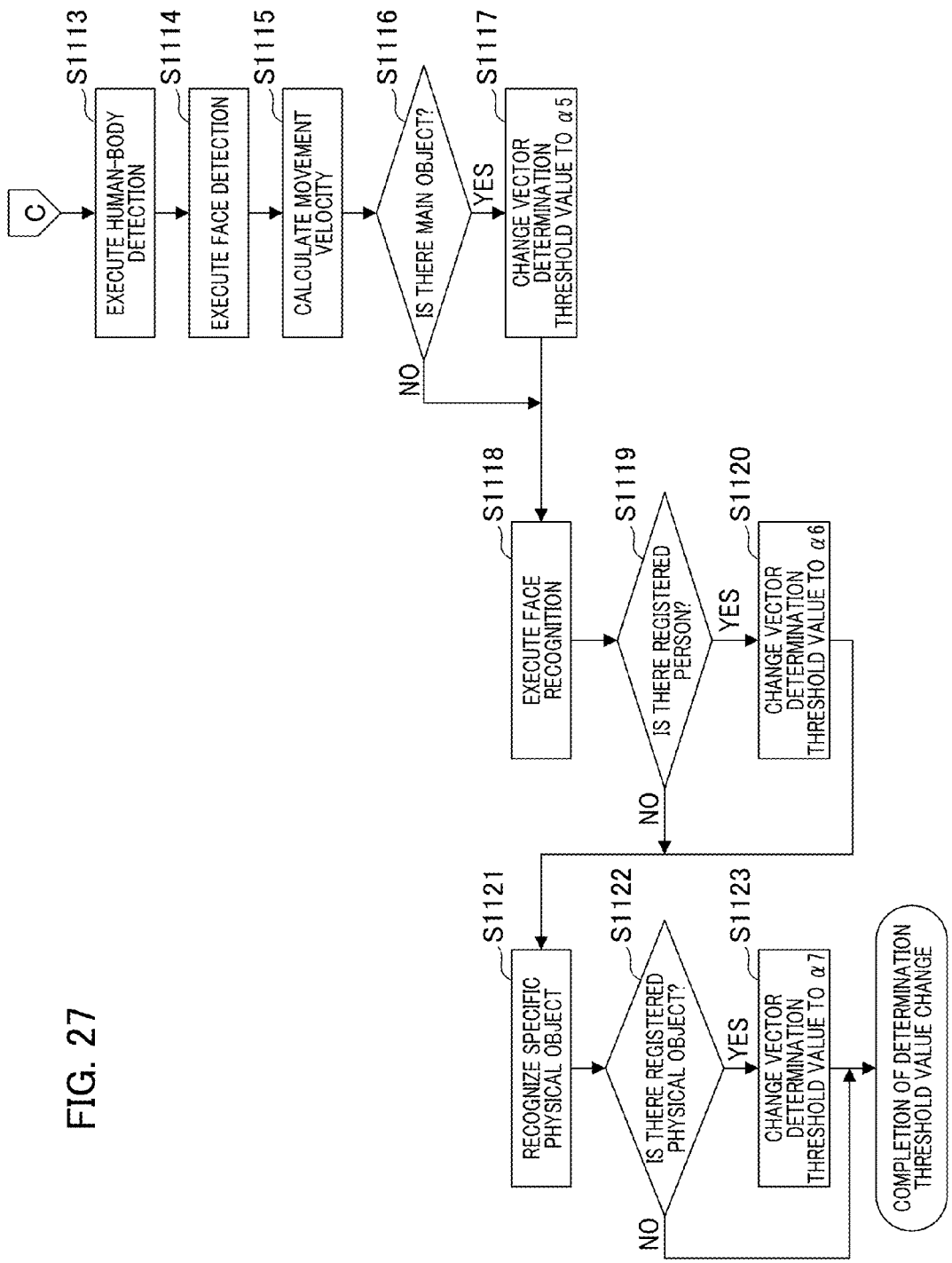
FIG. 27 is a flowchart illustrating a change process on the determination threshold value of the motion vector.

FIGS. 26 and 27 are a flowchart illustrating a process of changing the determination threshold value of the motion vector in Embodiment 6.

S1101 to S1112 of FIG. 26 are similar to S1001 to S1012 of FIG. 23. In addition, S1113 to S1120 of FIG. 27 are similar to S1013 to S1020 of FIG. 24.

Figure 28:
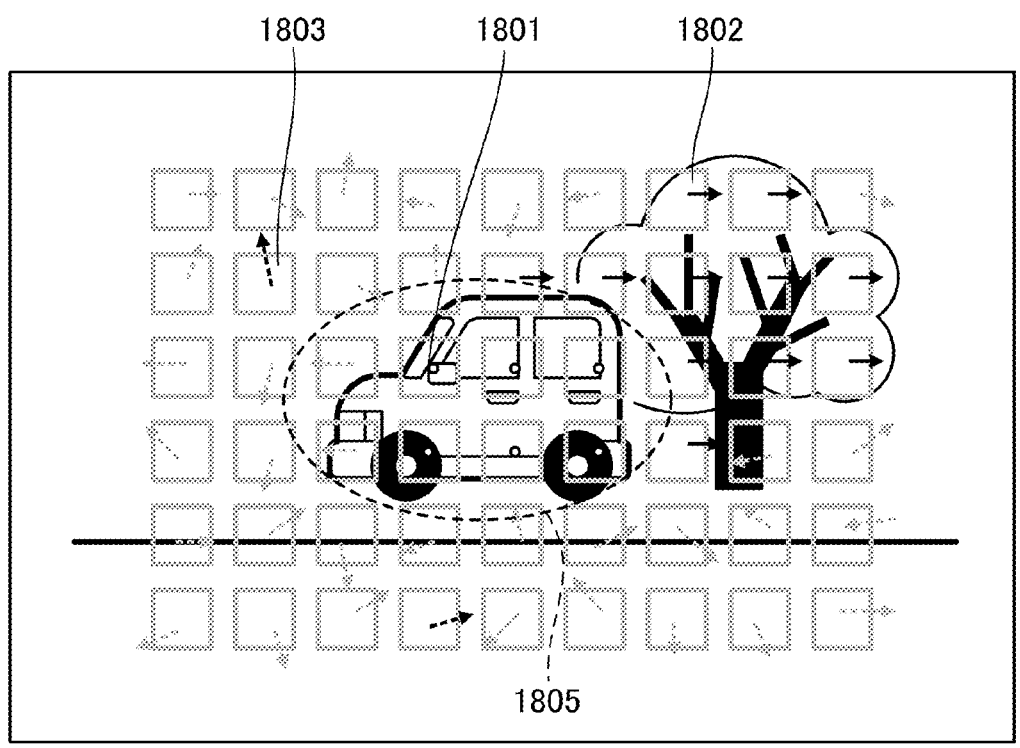
FIG. 28 is a diagram illustrating a change process on the determination threshold value of the motion vector.

In S1121, the camera microcomputer 132 applies a specific-physical-object recognition algorithm embedded in the object detection unit 142 to an image formed in the imaging element 122 during panning. The specific-physical-object recognition algorithm to be applied, for example, is SHIFT. In S1121, an area (denoted by reference number 1805 of FIG. 28) where there is a specific physical object serving as the main object is found.

Next, in S1122, the camera microcomputer 132 determines whether the pre-registered physical object is recognized based on an application result of the specific-physical-object recognition algorithm in S1121. When the registered physical object is not recognized, the process ends.

When the registered physical object is recognized, the process proceeds to S1123. In S1123, the camera microcomputer 132 sets α7 (FIG. 12) as the determination threshold value. Specifically, the camera microcomputer 132 sets different determination threshold values α7 in a main object area and an area other than the main object area. According to this embodiment, it is possible to precisely calculate an angular velocity of the main object by setting a plurality of determination threshold values α7 in each of the main object which is the detected specific physical object and the area other than that of the main object.

(Other Embodiments)

Embodiment(s) of the present invention can also be realized by a computer of a system or apparatus that reads and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, read and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-rayDisc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244785, filed Dec. 3, 2014, which is hereby incorporated by reference wherein in its entirety.

What is claimed is:

1. An image shake correction device for performing panning photographing the device comprising:
   a processor programmed to function as:
   a correction unit configured to correct a difference between an angular velocity data of an image pickup apparatus detected by an angular velocity detection unit and a movement angular velocity data of the main subject calculated from a motion vector detected based on the signal output from an imaging element by using an optical correction unit,
   a determination unit configured to execute a determination process on a motion vector to calculate an angular velocity of the main object for use in calculation of a drive signal of the optical correction unit; and
   a control unit configured to change the determination process by the determination unit according to a state of the image pick-up apparatus,
   wherein the determination unit determines whether the detected motion vector is a motion vector of a main object or a motion vector of a background, and
   wherein the control unit changes a determination threshold value which serves as a criterion of the determination according to the state of the image pick-up apparatus.

2. The image shake correction device according to claim 1, comprising:
   a detection unit configured to detect the state of the image pick-up apparatus;
   wherein the control unit changes the determination threshold value according to the detected state of the image pick-up apparatus.

3. The image shake correction device according to claim 1, wherein the control unit sets a first threshold value as the determination threshold value if the state of the image pick-up apparatus indicates that an acceleration operation is in progress at the initiation of the panning photographing.

4. The image shake correction device according to claim 1, wherein the control unit sets a second threshold value as the determination threshold value if the state of the image pick-up apparatus indicates that a constant-velocity operation is in progress.

5. The image shake correction device according to claim 1, wherein the control unit sets a third threshold value as the determination threshold value if the state of the image pick-up apparatus is a state in which an object is in focus in an automatic focus adjustment operation.

6. The image shake correction device according to claim 1, comprising:
   a face recognition unit configured to execute recognition of a face included in the captured image,
   wherein, if a face of a registered person is recognized, the control unit designates the person as the main object and sets a fourth threshold value as the determination threshold value for an area of the main object and an area other than the area of the main object.

7. The image shake correction device according to claim 6, wherein, if the face of the registered person is recognized, the control unit sets a threshold value fear which a motion vector detected from an area other than an area of the person is excluded from calculation of an angular velocity of the main object as the fourth threshold value for the area other than the area of the person.

8. The image shake correction device according to claim 1, wherein, if a registered specific physical object is included in the captured image, the control unit designates the specific physical object as the main object and sets a fifth threshold value as the determination threshold value for an area of the main object and an area other than the area of the main object.

9. An image shake correction device for performing panning photographing, the device comprising:
   a processor programmed to function as:
   a correction unit configured to correct a difference between angular velocity data of an image pickup apparatus detected by an angular velocity detection unit and movement angular velocity data of the main subject calculated from a motion vector detected based on the signal output from an imaging element by using an optical correction unit,
   a generation unit configured to generate a distance image which indicates a distance to the object from the captured image,
   a determination unit configured to execute a determination process on a motion vector to calculate an angular velocity of the main object for use in calculation of a drive signal of the optical correction unit; and
   a control unit configured to change the determination process by the determination unit according to a state of the image pick-up apparatus,
   wherein the determination unit determines whether the detected motion vector is a motion vector of a main object or a motion vector of a background, and
   wherein the control unit changes a determination threshold value which serves as a criterion of the determination according to the state of the distance image.

10. An image shake correction device for performing panning photographing, the device comprising:
a processor programmed to function as:
a correction unit configured to correct a difference between angular velocity data of an image pickup apparatus detected by an angular velocity detection unit and movement angular velocity data of the main subject calculated from a motion vector detected based on the signal output from an imaging element by using an optical correction unit,
a detection unit configured to detect an area of a person as the main object from the captured image,
a determination unit configured to execute a determination process on a motion vector to calculate an angular velocity of the main object for use in calculation of a drive signal of the optical correctional unit; and
a control unit configured to change the determination process by the determination unit according to a state of the image pick-up apparatus,
wherein the determination unit determines whether the detected motion vector is a motion vector of the detected area of a person or a motion vector of an area other than the detected area of a person,
wherein the control unit changes a determination threshold value which serves as a criterion of the determination according to the state of the image pick-up apparatus, and
wherein, if the detected person moves, the control unit sets a threshold value for which motion vectors detected from areas of limbs are excluded from calculation of an angular velocity of the main object as the fifth threshold value for the areas of the limbs of the person.

11. A control method of an image shake correction device for performing panning photographing, the method comprising:
correcting a difference between angular velocity data of an image pickup apparatus detected by an angular velocity detection unit and movement angular velocity data of the main subject calculated from a motion vector detected based on the signal output from an imaging element by using an optical correction unit,
executing a determination process on a motion vector for calculating an angular velocity of the main object for use in calculation of a drive signal of the optical correction unit,
changing the determination process in executing according to a state of the image pick-up apparatus,
determining whether the detected motion vector is a motion vector of a main object or a motion vector of a background, and
changing determination threshold value which serves as a criterion of the determination according to the state of the image pick-up apparatus.

12. A control method of an image shake correction device for performing panning photographing, the method comprising:
correcting a difference between angular velocity data of an image pickup apparatus detected by an angular velocity detection unit and movement angular velocity data of the main subject calculated from a motion vector detected based on the signal output from an imaging element by using an optical correction unit,
generating a distance image which indicates a distance to the object from the captured image,
executing a determination process on a motion vector for calculating an angular velocity of the main object for use in calculation of a drive signal of the optical correction unit,
changing the determination process in executing according to a state of the image pick-up apparatus,
determining whether the detected motion vector is a motion vector of a main object or a motion vector of a background, and
changing a determination threshold value which serves as a criterion of the determination according to the state of the distance image.

13. A control method of an image shake correction device for performing panning photographing, the method comprising:
correcting a difference between angular velocity data of an image pickup apparatus detected by an angular velocity detection unit and movement angular velocity data of the main subject calculated from a motion vector detected based on the signal output from an imaging element by using an optical correction unit,
detecting an area of a person as the main object from the captured image,
executing a determination process on a motion vector for calculating an angular velocity of the main object for use in calculation of a drive signal of the optical correction unit,
changing the determination process in executing according to a state of the image pick-up apparatus,
determining whether the detected motion vector is a motion vector of the detected area of a person or a motion vector of an area other than the detected area of a person, and
changing a determination threshold value which serves as a criterion of the determination according to the state of the image pick-up apparatus,
wherein, if the detected person moves, setting a threshold value for which motion vectors detected from areas of limbs are excluded from calculation of an angular velocity of the main object as the fifth threshold value for the areas of the limbs of the person.

* * * * *